(12) United States Patent  
Belasco

(10) Patent No.: US 8,894,866 B1  
(45) Date of Patent: Nov. 25, 2014

(54) STORM WATER TREATMENT SYSTEM AND METHOD

(75) Inventor: David Belasco, Westminster, CA (US)

(73) Assignee: Stormwater Filters Corp., Westminster, CA (US)

( * ) Notice: Subject to any disclaimer, the term of this patent is extended or adjusted under 35 U.S.C. 154(b) by 487 days.

(21) Appl. No.: 13/275,236

(22) Filed: Oct. 17, 2011

Related U.S. Application Data

(60) Provisional application No. 61/455,287, filed on Oct. 18, 2010.

(51) Int. Cl.
*E03F 1/00* (2006.01)
*E03F 5/10* (2006.01)
*C02F 103/00* (2006.01)

(52) U.S. Cl.
CPC ........... *E03F 1/003* (2013.01); *C02F 2103/001* (2013.01); *B01D 2221/12* (2013.01); *E03F 5/10* (2013.01)
USPC .............. 210/747.2; 210/170.03; 210/170.08; 210/254; 405/41; 405/43

(58) Field of Classification Search
CPC ............. E03F 1/00; E03F 1/002; E03F 1/003; E03F 5/10; B01D 29/01; B01D 2221/12; C02F 2103/001
USPC ................. 210/747.2, 747.3, 170.01, 170.03, 210/170.08, 254, 255; 405/36, 41, 43, 46
See application file for complete search history.

(56) References Cited

U.S. PATENT DOCUMENTS

| | | | |
|---|---|---|---|
| 952,985 A | 3/1910 | Ernsberger | |
| 4,021,979 A | 5/1977 | Rez | |
| 4,942,702 A | 7/1990 | Lemasson | |
| 5,297,367 A | 3/1994 | Sainz | |
| 5,433,845 A * | 7/1995 | Greene et al. | ............ 210/170.03 |
| 5,628,623 A | 5/1997 | Skaggs | |
| 5,720,574 A | 2/1998 | Barella | |
| 5,744,048 A | 4/1998 | Stetler | |
| 5,791,291 A | 8/1998 | Strong et al. | |
| 5,931,643 A | 8/1999 | Skaggs | |
| 5,958,226 A | 9/1999 | Fleischmann | |
| 5,960,524 A | 10/1999 | Darby et al. | |
| 6,017,195 A | 1/2000 | Skaggs | |
| 6,062,167 A | 5/2000 | Soley | |
| 6,080,307 A | 6/2000 | Morris et al. | |
| 6,099,723 A | 8/2000 | Morrsi et al. | |
| 6,202,370 B1 | 3/2001 | Miller et al. | |
| 6,344,519 B1 | 2/2002 | Rink et al. | |
| 6,493,911 B1 | 12/2002 | Troin et al. | |
| 6,510,659 B2 | 1/2003 | Boyer et al. | |
| 6,524,473 B2 * | 2/2003 | Williamson | ............. 210/170.03 |

(Continued)

OTHER PUBLICATIONS

Whal et al, Labor-Saving Debris and Fish Screens, Water O&M Bulletin, vol. 208, Jun. 2004.

*Primary Examiner* — Christopher Upton

(74) *Attorney, Agent, or Firm* — John J. Connors; Connors & Assoc. pc.

(57) ABSTRACT

A storm water treatment system accomplishes low impact development compliant treatment of storm water with filtrate discharged to an underground infiltration structure. The system has an automatic high-flow bypass under gravity flow, even on flat sites, plus automatic standing water drain-down for mosquito control and de-watering of collected solids. This system incorporates unique distributional piping schemes enabling periodic removal of suspended solids from otherwise inaccessible structures.

18 Claims, 16 Drawing Sheets

(56) References Cited

U.S. PATENT DOCUMENTS

| | | | |
|---|---|---|---|
| 6,562,233 B1 | 5/2003 | Schilling et al. | |
| 6,606,836 B2 | 8/2003 | Miller | |
| 6,705,049 B2 | 3/2004 | Esmond et al. | |
| 6,783,683 B2 * | 8/2004 | Collings | 210/170.03 |
| 6,901,640 B2 | 6/2005 | Sevey | |
| 6,911,076 B2 | 6/2005 | Keshmiri | |
| 6,953,529 B2 | 10/2005 | Weir | |
| 6,976,345 B2 | 12/2005 | Keshmiri | |
| 6,991,734 B1 * | 1/2006 | Smith et al. | 210/747.3 |
| 7,258,785 B2 | 8/2007 | Weir et al. | |
| 7,300,590 B2 | 11/2007 | Weir et al. | |
| 7,441,661 B2 * | 10/2008 | Phillips | 210/170.03 |
| 7,475,515 B2 | 1/2009 | Machledt et al. | |
| 7,584,577 B2 | 9/2009 | Esmond et al. | |
| 7,805,890 B2 | 10/2010 | Esmond et al. | |
| 7,988,851 B2 * | 8/2011 | Olson et al. | 210/170.03 |
| 8,062,531 B1 * | 11/2011 | LoBello | 210/747.2 |
| 8,147,688 B2 * | 4/2012 | Adams et al. | 210/170.03 |
| 2005/0230317 A1 | 10/2005 | Belasco et al. | |
| 2007/0033887 A1 | 2/2007 | Ambrose | |
| 2007/0258770 A1 * | 11/2007 | Miskovich | 405/43 |
| 2009/0050583 A1 * | 2/2009 | Arnott et al. | 210/170.03 |
| 2010/0006487 A1 * | 1/2010 | Belasco | 210/164 |
| 2010/0193418 A1 * | 8/2010 | Belasco | 210/170.03 |

\* cited by examiner

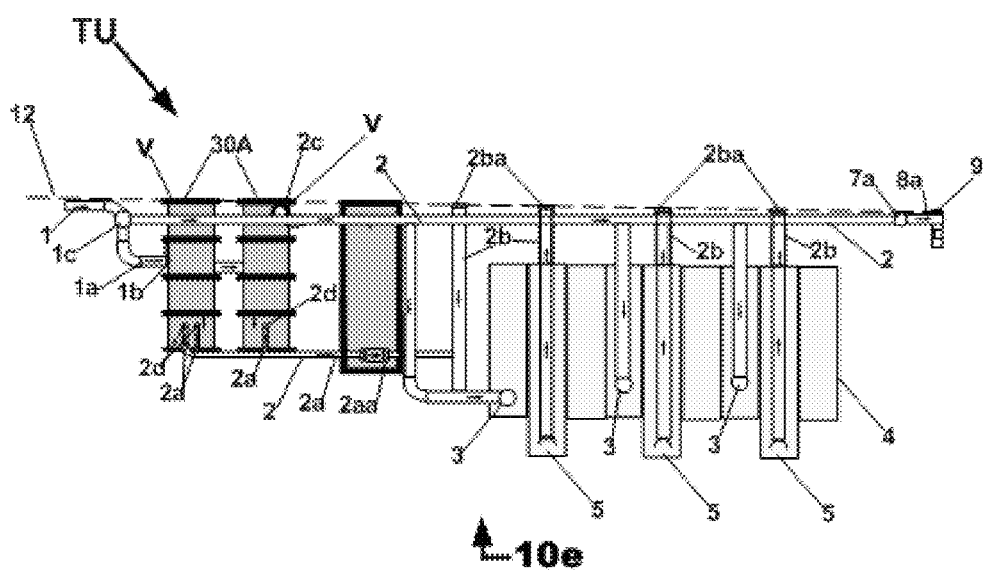

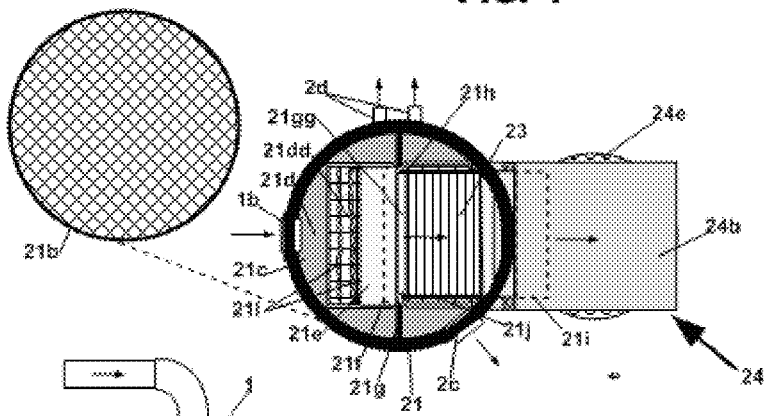
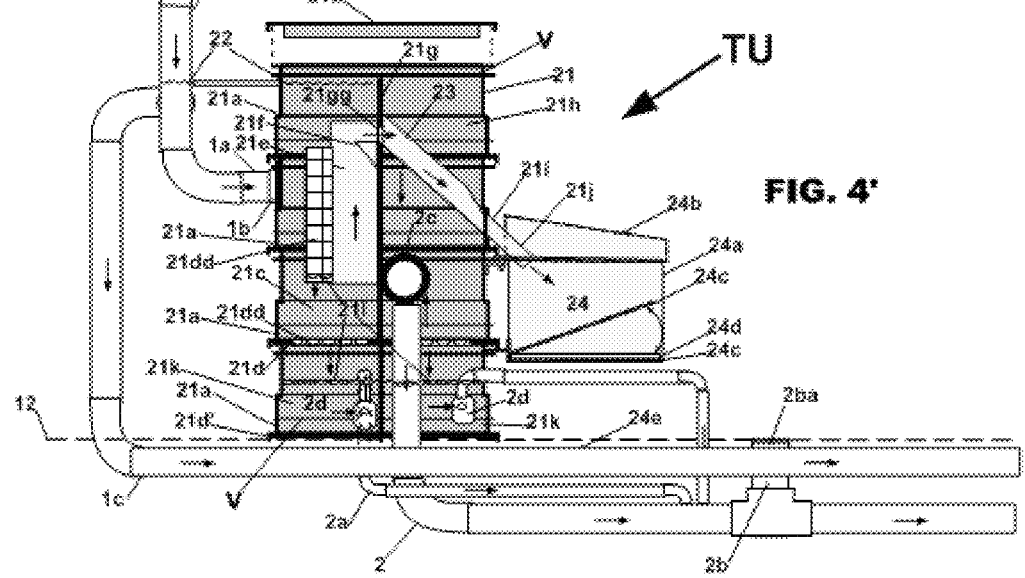

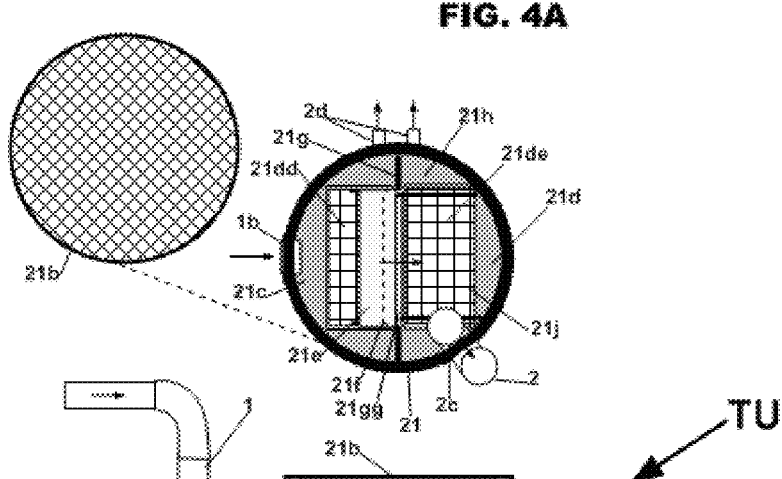
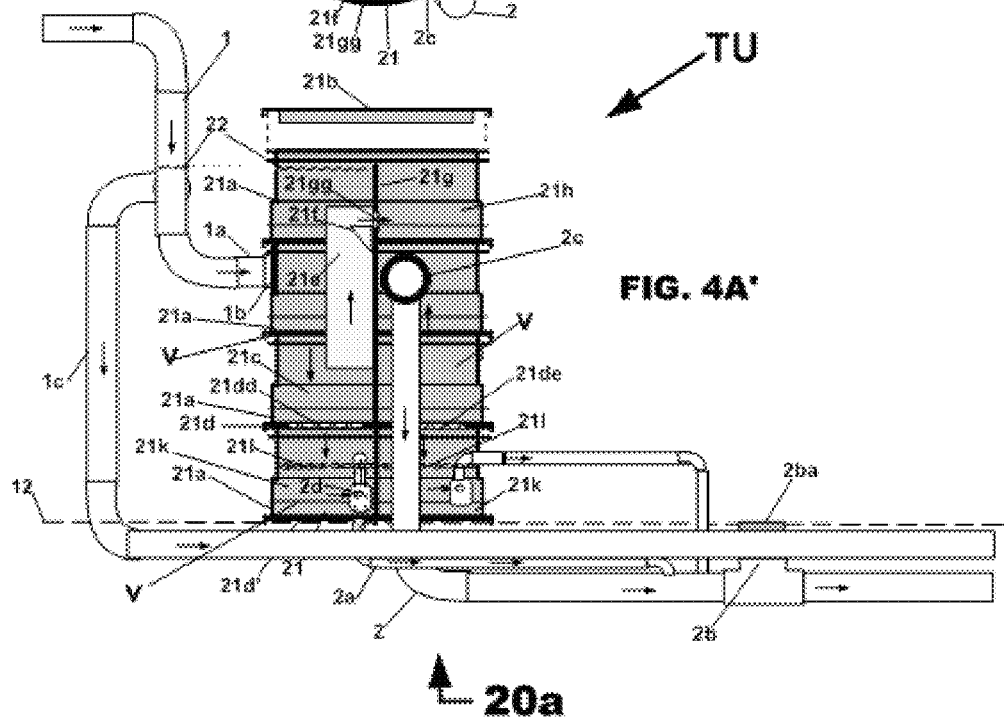
FIG. 4A
FIG. 4A'

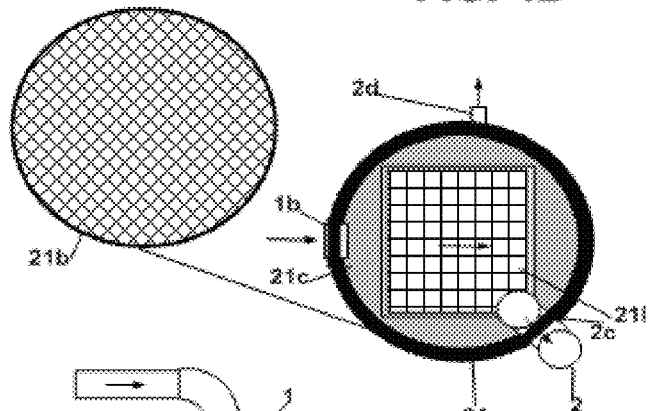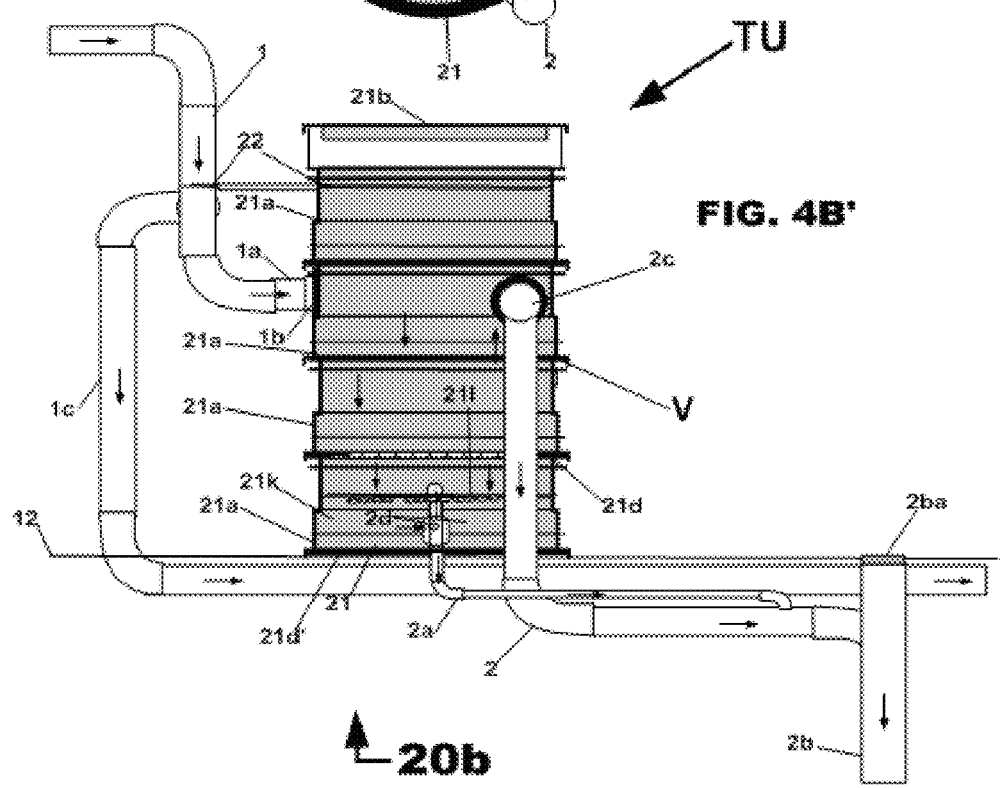
FIG. 4B
FIG. 4B'

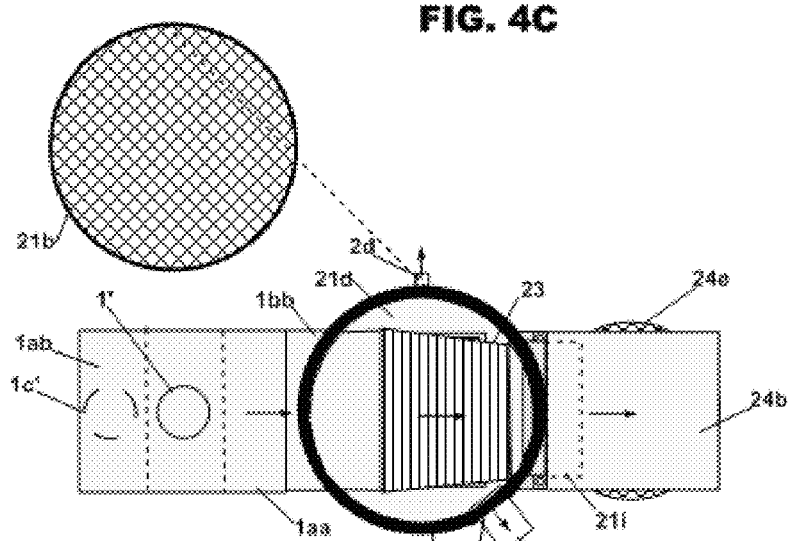
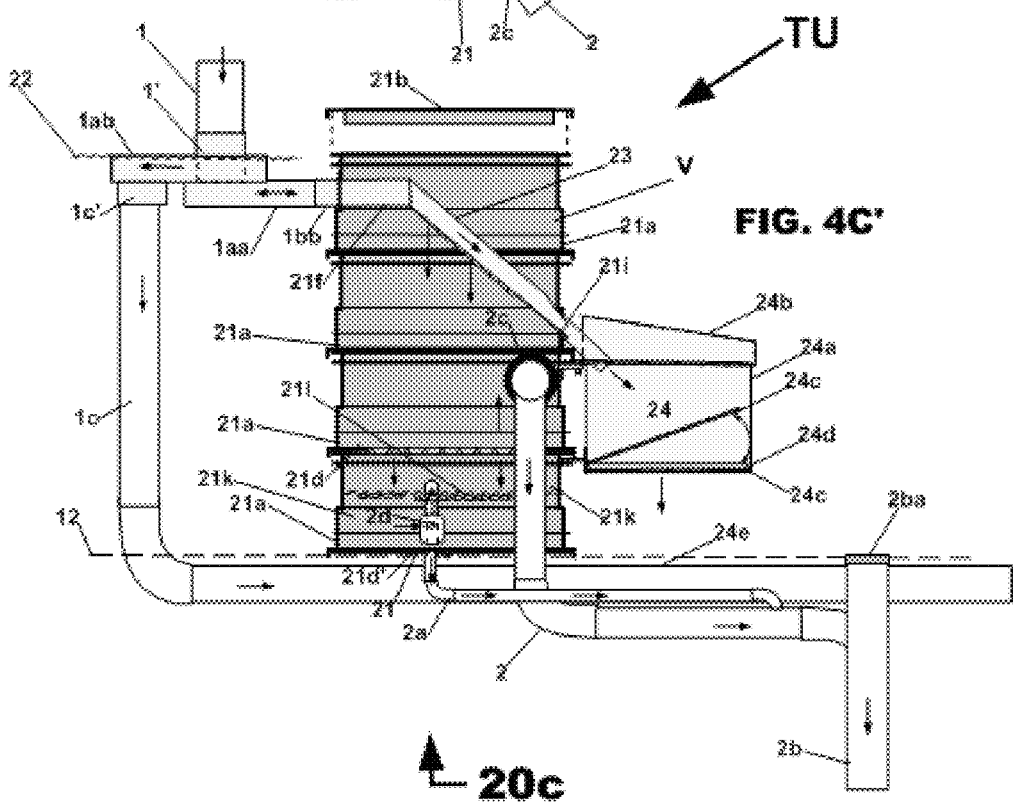
FIG. 4C
FIG. 4C'

FIG. 5A
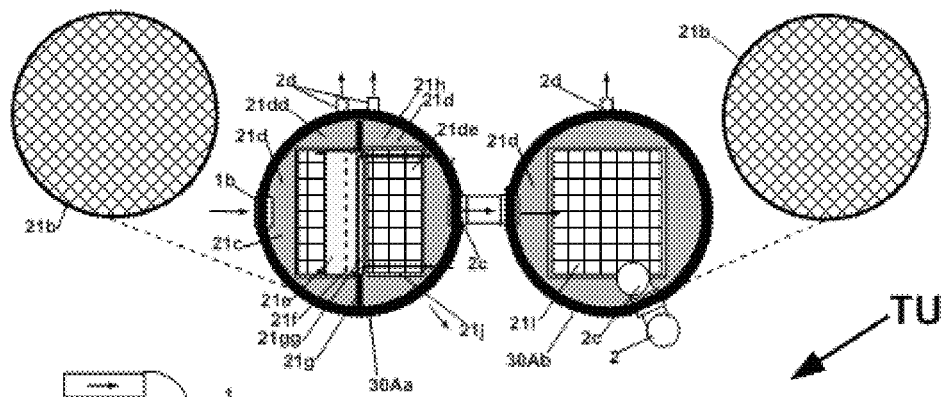
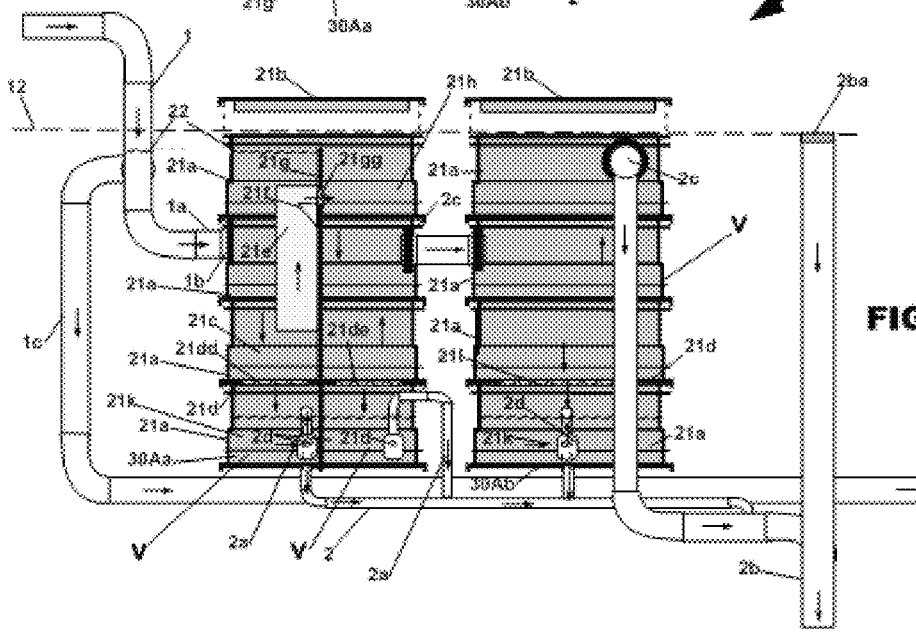
FIG. 5A'

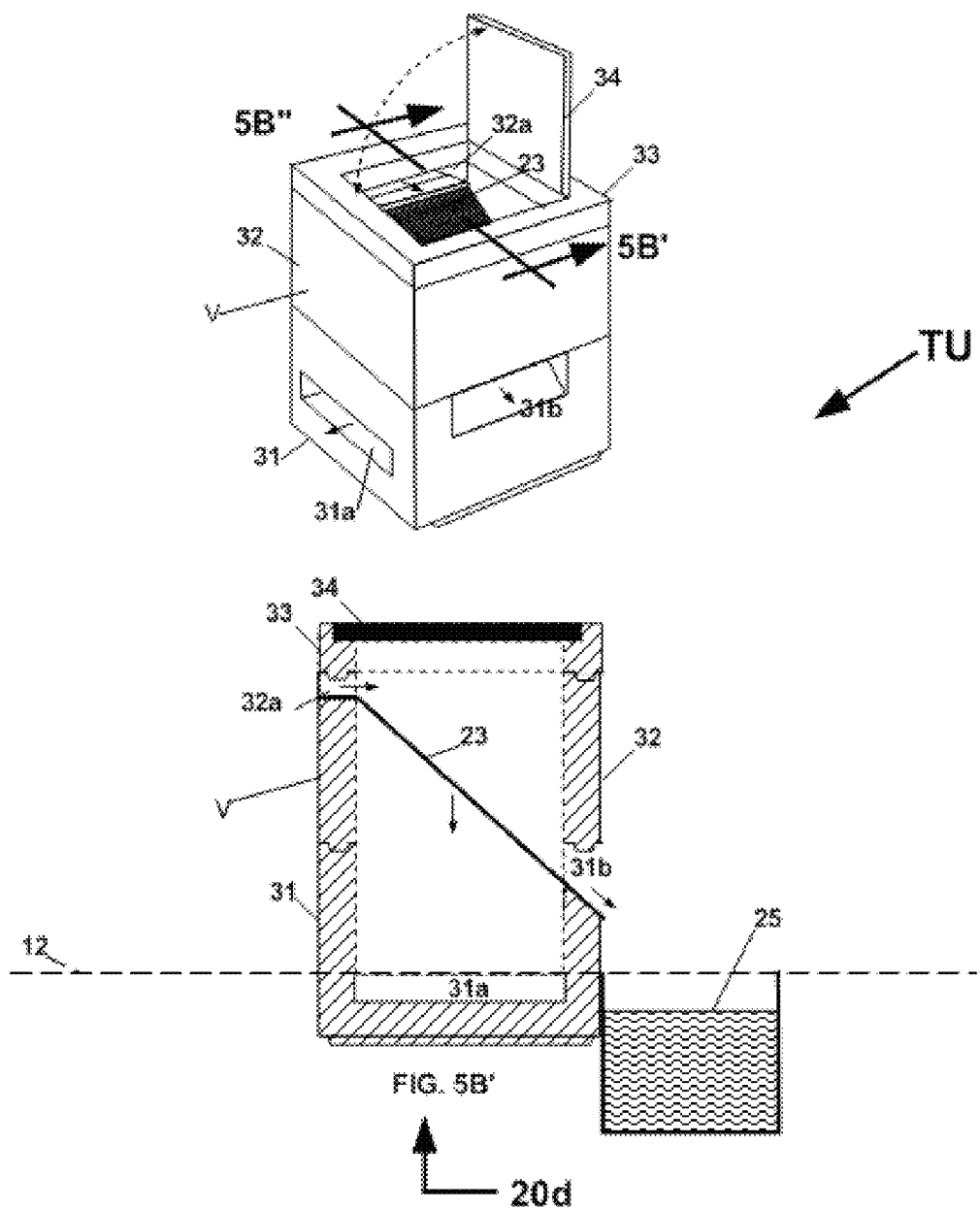

STORM WATER TREATMENT SYSTEM AND METHOD

RELATED PATENT APPLICATIONS & INCORPORATION BY REFERENCE

This application claims the benefit under 35 USC 119(e) of U.S. provisional patent application Ser. No. 61/455,287, entitled "Low Impact Development (LID) Storm Water Treatment Detention/Infiltration System & Method," filed Oct. 18, 2010. This related application is incorporated herein by reference and made a part of this application. If any conflict arises between the disclosure of the invention in this utility application and that in the related provisional application, the disclosure in this utility application shall govern. Moreover, the inventor incorporates herein by reference any and all U.S. patents, U.S. patent applications cited or referred to in this application or cited or referred to in the U.S. patents and U.S. patents applications incorporated herein by reference.

DEFINITIONS

The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items.

The word "rectangular" includes square.

The words "substantially" and "essentially" have equivalent meanings

The word "inlet" includes one or more ports, with the total cross-sectional area of the inlet being the sum of the individual cross-sectional areas of ports making up an inlet.

The word "outlet" includes one or more ports, with the total cross-sectional area of the outlet being the sum of the individual cross-sectional areas of ports making up an outlet.

BACKGROUND

Low impact development (LID) municipal ordinances require on-site retention and treatment of a fraction of storm water that would be discharged offsite. The total maximum daily load limit (TMDL) requirement dictates the type and configuration of treatment elements for each site. Where soil and site landscaping allow, naturally occurring swales will be used. Some sites will, however, require installation of treatment structures either alone or in combination with naturally occurring swales to minimize project-life cost, using the minimum number of necessary treatment structures. When multi pre-treatment steps are necessary, the first treatment stage will be removal or reduction of total suspended solids (TSS) and total oil and grease (TOG). Any dissolved constituents adsorb on suspended solid will also be removed.

This treated storm water (herein filtrate) may be discharge directly to the selected infiltration stage (swale or infiltration structure) or be discharged to subsequent tertiary treatment stages for removal of fine particulate, bacteria, or specific dissolved constituents. Such tertiary treatment is before delivery to a detention structure or an infiltration structure. A detention structure is used when the effluent cannot be discharged offsite. An infiltration structure is used to infiltrate directly into suitable soils to recharge local groundwater or for various uses such as landscape watering.

SUMMARY

My storm water treatment system employs gravity to accomplish the maximum possible transfer of storm water from a selected watershed surface to a treatment unit, where the filtrate flows in a controlled manner to an underground infiltration structure. At some sites, a minimal amount of the treated storm water may require powered pumping to accomplish the treatment objectives of removal of very fine suspended solids and dissolved contaminants. The system has automatic prevention of mosquito development and de-watering of collected solids. To minimize project-life cost, the system is configured for easy access for periodic inspection and removal of captured suspended solids and hydrocarbon collection media, and replacement of treatment unit media as needed, without the need for personnel trained and certified in confined space access procedures. Additionally, the system may be configured to allow periodic cleaning to maximize reuse of components post-cleaning and the possible recovery of captured constituents such as metals, which may have post-recovery market value.

My system and method have one or more of the features depicted in the embodiments discussed in the section entitled "DETAILED DESCRIPTION OF SOME ILLUSTRATIVE EMBODIMENTS." The claims that follow define this system and method in terms that distinguish it from the prior art; however, without limiting the scope of this invention as expressed by these claims, in general terms, some, but not necessarily all, of the features are: One, my system treats storm water flowing from a selected watershed surface so that the effluent water from the surface complies with low impact development regulations. It includes an underground infiltration structure and, upstream of the infiltration structure, a treatment unit.

Two, the treatment unit removes from the storm water flowing through it suspended solids and hydrocarbons. The treatment unit has a sufficient volumetric capacity to treat a predetermined initial fraction of the storm water flowing from the watershed surface into the treatment unit through an inlet to the treatment unit. The predetermined initial fraction (Qpm) is a first portion of a predetermined maximum volumetric discharge (Qmax) of the storm water from the selected watershed surface to be treated in accordance with the low impact development regulations governing the selected watershed surface. To be in compliance with the low impact development regulations governing the selected watershed surface, the flow rate of water entering the treatment unit must be at a controlled predetermined rate and not exceed at predetermined maximum rate for the selected watershed surface. As rain falls on the watershed surface, substantially all the storm water falling on the surface may be directed into and through my system. When the rainfall is very heavy, however, the rate of storm water flowing to the treatment unit inlet is at a rate greater than the predetermined maximum rate.

Three, the inlet to the treatment has a cross-sectional area dimension that limits the rate of inflow into the treatment unit to the predetermined maximum rate. Any excess water entering the system is diverted to a bypass line without entering the treatment unit. Normally, this diverted water flows offsite, but it may be stored onsite or at another location. During rainfall, water constantly flows through the treatment unit into the underground infiltration structure, but at a regulated maximum flow rate determined by the low impact development regulations governing the selected watershed surface. Treated water is retained for a predetermined dwell time in the underground infiltration structure and slowly seeps into the ground.

Four, an outlet from the treatment unit is in communication with an inlet to the infiltration structure. The treatment unit outlet has a predetermined cross-sectional area that enables storm water flowing into the treatment unit to exit the treatment unit at a rate at least equal to the rate at which storm water flows into the treatment unit. The inlet to the treatment unit regulates the rate at which influent storm water enters the treatment unit, with its predetermined cross-sectional area controlling the flow of storm water into the treatment unit, diverting any excess water entering the system to a bypass line. The treatment unit inlet is thus configured to limit the flow rate of storm water into the treatment unit to cause storm water in excess of that flow rate to back up into a pipe member connected to the bypass line so the excess storm water flows into the bypass line.

Five, the treatment unit inlet and outlet, bypass line outlet, and underground infiltration structure are positioned relative to each other so that storm water flows through the system essentially solely by gravity. The relative positions of the treatment unit inlet and outlet, bypass line outlet, and underground infiltration structure provide automatic drain down of substantially all post-rainfall standing water in the system. This is useful for mosquito control and de-watering of collected solids in the treatment unit. The flow of treated storm water from the treatment unit may be prevented from backing up and filling the treatment unit by a back-flow prevention device. Where the gradient of the watershed surface is essentially zero and the treatment unit may be entirely above the selected watershed surface or partially or fully-buried as needed to maintain gravity flow. The treatment unit has a flow rate capacity at least equaling the predetermined fraction specified for a predetermined maximum volumetric discharge (Qmax) of the storm water flowing from the watershed surface and the bypass line has a flow rate capacity at least equal to the difference between the Qmax and the Qpm. The treatment unit is configured so that the cross-sectional area of the treatment unit outlet or outlets may be sufficiently greater than the cross-sectional area of the treatment unit inlet to reduce the velocity of storm water flowing from said treatment unit outlet and improve gravity-settling of fine particulate solids having a particle diameter substantially from <300 to <25 microns.

Six, the treatment unit comprise a plurality of separate vault modules, for example, made of concrete or a plastid, that are stacked together and sealed at interfaces. Advantageously, each complete, assembled, and delivered plastic treatment unit may have a weight low enough that it can be carried, stored and/or placed into position for use by as few as two, but not more than four persons. For example, it may be less than 300 pounds, enabling handling by not more than four persons and not requiring mechanical equipment for handling. The treatment unit may comprise a plurality of stacked plastic vault modules of suitable strength to be buried at a predetermined underground depth with a removable top cover at or near the watershed surface. The plastic may comprise injection molded polypropylene or molded fiberglass. Alternately, the vault modules may be concrete and are much heavier than the plastic vault modules.

Seven, my system may comprises a plurality of treatment units and the predetermined initial fraction flows thus flows through multiple treatment units prior to flowing into the infiltration structure. A substantially horizontal or slanted solids collection structure deployed within the treatment unit captures suspended solids that settle by gravity. A stainless steel, self-cleaning, non-clogging screen may be used. This screen may advantageously be oriented at an angle to slope downward between the treatment unit inlet and the treatment unit outlet and is positioned so that substantially all the storm water flowing into the treatment unit flows through the screen. The screen may have a perimeter that is held between adjacent vaults on a slant. One such slanted screen separates water from entrained solids and diverts the water through the screen leaving solids having an average particle size greater than 300 microns. The collected solids discharge by gravity at an outlet end of the screen.

Eight, the infiltration structure may include a bottom-most chamber for holding storm water. Means for withdrawing very fine solid particles are provided by a perforated pipe member horizontally extending substantially along a lower portion of the chamber. A vertical riser connected to the perforated pipe member and a removable cap connected to a riser end that terminates at or near the watershed surface affords a pathway to suction the collected solids from the bottom-most chamber.

In my method storm water falling on a selected watershed site is treated in compliance with low impact development regulations governing the site. It comprises the steps of (a) directing storm water falling on the surface of the watershed site into a treatment unit that removes suspended solids and hydrocarbons from influent storm water flowing through the treatment unit and then into a downstream underground infiltration structure, said treatment unit and infiltration structure being on site, and said treatment unit having a sufficient volumetric capacity to treat a predetermined initial fraction of the storm water flowing from the watershed surface to be in compliance with said low impact development regulations governing said selected watershed site, (b) positioning the treatment unit inlet and outlet and underground infiltration structure relative to each other so that storm water flows through the system essentially solely by gravity, and (c) whenever the rate at which influent storm water at the treatment unit inlet exceeds a predetermined maximum rate in order to be in compliance with low impact development regulations governing said selected watershed site, diverting any excess influent storm water entering the system into a bypass line.

Stated differently, my method includes the steps of (a) directing by gravity storm water into a treatment unit that removes suspended solids and hydrocarbons from the storm water, said water flowing from the selected watershed surface into a treatment unit at an uncontrolled rate, said treatment unit having an inlet sized to control the flow of storm water into the treatment unit at a predetermined rate to be in compliance with the low impact development regulations governing said selected watershed surface, (b) directing by gravity treated storm water from the treatment unit into a downstream underground infiltration structure, and (c) diverting by gravity any excess water entering the system to flow offsite when the rate of storm water flowing to the treatment unit is at a rate greater than said controlled predetermined rate.

These features are not listed in any rank order nor is this list intended to be exhaustive.

DESCRIPTION OF THE DRAWING

Some embodiments of my system and method, illustrating all their features, will now be discussed in detail in connection with the accompanying drawing, which is for illustrative purposes only. This drawing includes the following figures (FIGS.), with like numerals indicating like parts:

FIG. 3B is a schematic side view of a sixth embodiment of my storm water treatment system.

FIG. 4 a schematic plan view of the Hydro-Master™/Coanda™ (HMC) treatment unit used in the treatment system illustrated in FIGS. 1 and 2, with an exploded solid cover.

FIG. 4' is a schematic side view of the embodiment of my storm water treatment unit shown in FIG. 4.

FIG. 4A a schematic plan view of the Hydro-Master™ (HM) two-stage treatment system depicted in FIG. 4A', with an exploded solid cover.

FIG. 4A' is a schematic side view of the embodiment of my storm water treatment unit shown in FIG. 4A.

FIG. 4B is a schematic plan view of the Hydro-Master™ (HM) single-stage treatment unit, with an exploded solid cover.

FIG. 4B' is a schematic side view of the embodiment of my storm water treatment unit shown in FIG. 4B.

FIG. 4C is a schematic plan view of a Hydro-Master™/Coanda™ (HMC) single-stage treatment unit with rectangular inlet porting, rectangular solids outlet porting and round liquid outlet porting with external high-flow bypass control used with the embodiment shown in FIG. 2.

FIG. 4C' is a schematic side view of the embodiment of my storm water treatment unit shown in FIG. 4C.

FIG. 5' is a schematic side view of the embodiment of my storm water treatment unit shown in FIG. 5.

FIG. 5A is a schematic plan view of a Hydro-Master™ (HM) three-stage treatment system used with the storm water treatment system shown in FIG. 3A, with an exploded solid covers.

FIG. 5A' is a schematic side view of the embodiment of my storm water treatment unit shown in FIG. 5A.

FIG. 5B is a perspective view of an alternative Hydro-Master™/Coanda™ (HMC) single-stage pre-cast concrete treatment unit.

FIG. 5B' is a schematic side view of the embodiment of my storm water treatment unit shown in FIG. 5B.

DETAILED DESCRIPTION OF SOME ILLUSTRATIVE EMBODIMENTS

General

Figure 1:
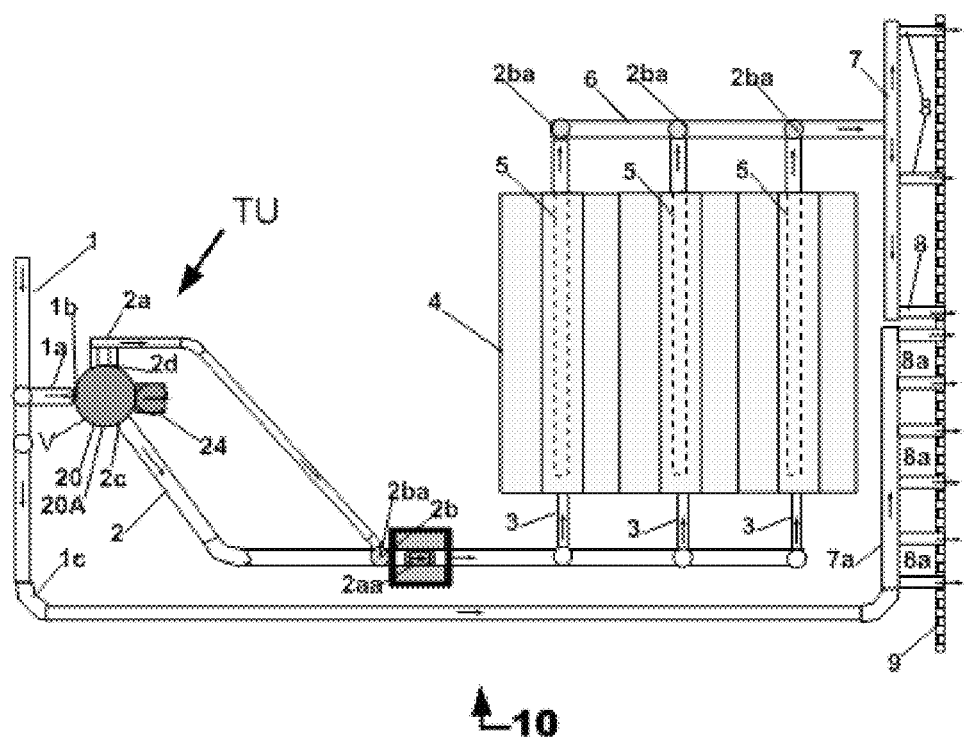
FIG. 1 is a schematic plan view of one embodiment of my storm water treatment system.
Figure 1A:
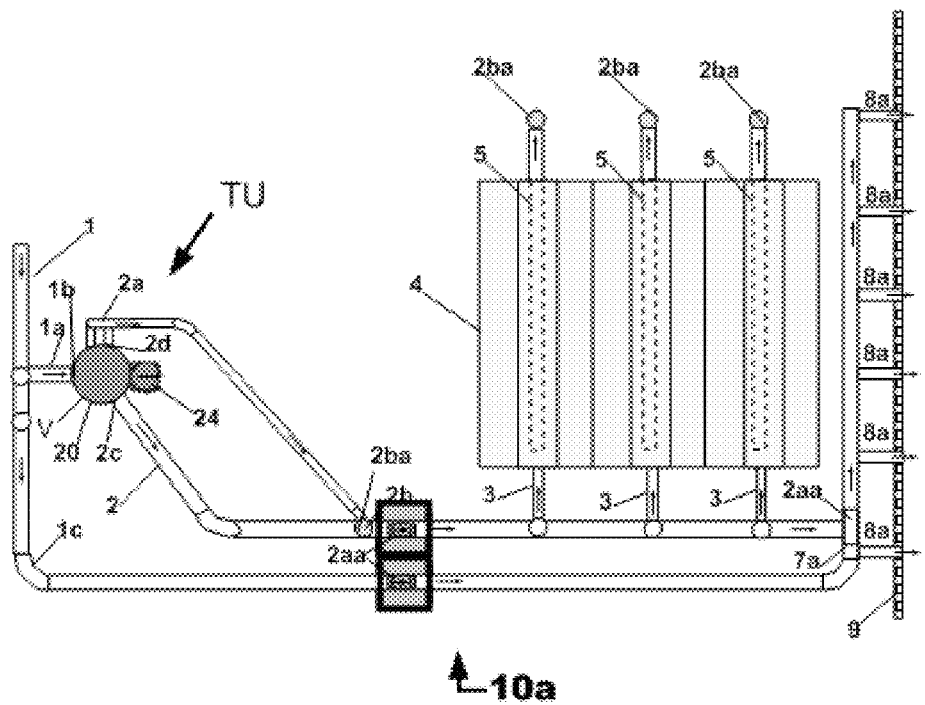
FIG. 1A is a schematic plan view of a second embodiment of my storm water treatment system.
Figure 2:
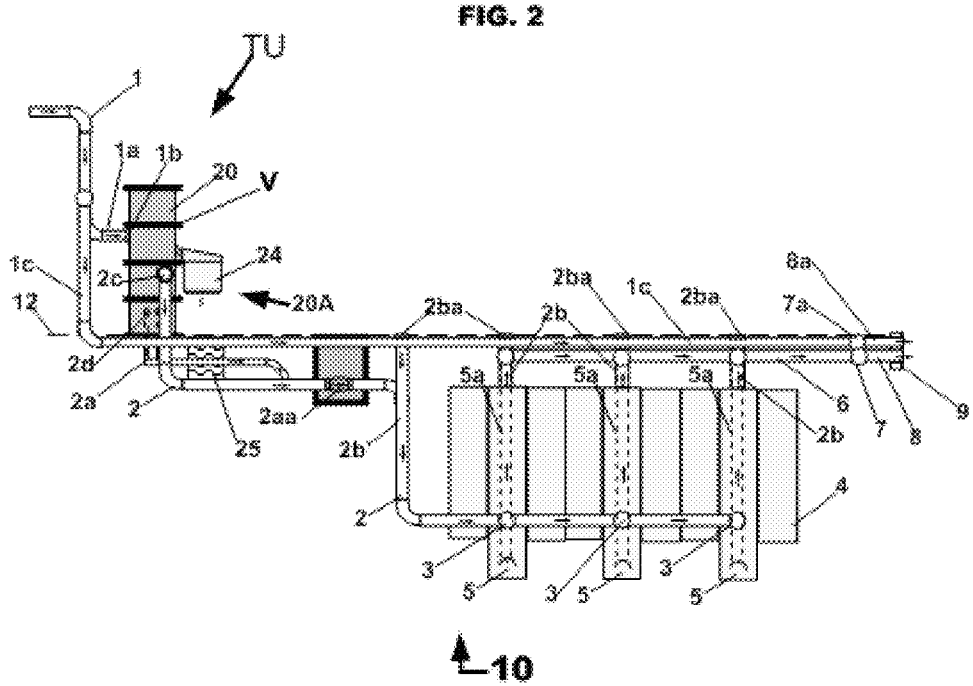
FIG. 2 is a schematic side view of the embodiment of my storm water treatment system shown in FIG. 1.

The embodiment of my treatment system depicted in FIGS. 1 and 2 and generally designated by the numeral 10 shows a Hydro-Master™/Coanda™ (HMC) treatment unit TU that provides LID-compliant primary and secondary TSS and TOG removal, on an essentially flat site, as pre-treatment to an underground detention/infiltration structure 4, with high flow bypass to offsite discharge via a bypass pipe 1c. The embodiment of my treatment system depicted in FIGS. 1A and 2A and generally designated by the numeral 10a shows a piping arrangement that allows high flow bypass to automatically follow a path closer to a watershed's surface near grade level and discharge through the adjacent perimeter curb to offsite. The embodiment of my treatment system depicted in FIG. 2B and generally designated by the numeral 10b shows a Hydro-Master™ (HM) single-stage treatment unit TU2 providing LID-compliant TSS and TOG removal, on an essentially flat site, as pre-treatment to an underground detention/infiltration structure 4, with high flow bypass to offsite discharge. My treatment system 10b has a curb high-flow bypass water discharge automatically combining with overflow discharge of the filtrate to the detention/infiltration structure 4. The embodiment of my treatment system depicted in FIG. 3 and generally designated by the numeral 10c shows a Hydro-Master™/Coanda™ (HMC) treatment unit TU including at least one HMC solids receiver unit providing LID-compliant primary TSS removal plus TOG removal as treatment to an underground detention/infiltration structure 4, on sites with sufficient elevation gradient to enable underground gravity high flow bypass to offsite discharge. The embodiment of my treatment system depicted in FIG. 3A and generally designated by the numeral 10d shows an alternative Hydro-Master (HM) two-stage treatment unit TU consisting of at least one HM treatment unit and one HM solids receiver unit providing LID-compliant TSS removal plus TOG removal as pre-treatment to an underground detention/infiltration structure 4. The embodiment of my treatment system depicted in FIG. 3B and generally designated by the numeral 10e uses a Hydro-Master™ (HM) two-stage treatment system including at least one HM treatment unit and one HM solids receiver unit providing LEED-compliant TSS removal plus TOG removal as pre-treatment to an underground detention/infiltration structure 4. The embodiment of my treatment system depicted in FIG. 6 and generally designated by the numeral 10f depicts a "maximum deployment array" configuration of a Hydro-Master™/Coanda™ (HMC) treatment illustrated FIG. 5 comprising four (4) treatment units combined to discharge primary solids collection into one (1) solids receiver unit. FIG. 6 is a schematic plan view of a seventh embodiment of my storm water treatment system.

FIGS. 1 and 2

My treatment system 10 depicted in FIGS. 1 and 2 uses the Hydro-Master™/Coanda™ (HMC) treatment unit TU to provide LID-compliant primary total suspended solids (TSS) and total oil and grease (TOG) removal with filtrate discharge and automatic drain-down to an underground infiltration structure 4, with high flow bypass of overflow to offsite discharge. The treatment unit TU may comprise a single or multiple vaults V comprised of modules stacked upon each other. These modules may be made of plastic or concrete. They may have different cross-sections such as, for example, circular, rectangular, hexagonal etc. And they may have a seal disposed between their adjacent and abutting perimeters. Concrete vaults are discussed respectively in U.S. patent application Ser. No. 12/485,690, filed Jun. 16, 2009 and Ser. No. 12/696,057, filed Jan. 29, 2010, and are manufactured by various concrete pre-casters to drawings provided by Stormwater Filters Corp (SFC) of Westminster, Calif., USA. Fiberglass risers used by SFC to make rectangular, square or hexagonal vaults are manufactured by various fiberglass fabricators to drawings provided by Stormwater Filters Corp (SFC). Polypropylene risers used by SFC to make cylindrical plastic vaults are manufactured by Infiltration Systems, Inc. (ISI) of Old Saybrook, Conn., USA, and others.

As shown in FIGS. 4 and 4A, treatment units TU include disposable floating mesh pads 211 for collecting hydrocarbons and stainless steel structures 21dd for controlling their positioning. The vaults V have perimeter surfaces that are placed together so that facing perimeter surfaces abut each other so they are contiguous and in registration having essentially the same perimeter dimensions and configuration (in this embodiment circular). Lodged between adjacent vault sections is a water-filter such as, for example, a screen 23 mounted on an angle. The screen 23 may be a stainless steel, self-cleaning, non-clogging wedgewire screen manufactured by Coanda, LLC, of Irvine, Calif., or Hydroscreen, LLC of Denver, Colo. Such screens are discussed in U.S. Pat. Nos. 6,705,049 and 7,584,577. They may be installed either alone or in parallel multiple arrays as appropriate for each system. With the screen 23 thus positioned, the water is filtered through the screen and debris is collected on the surface of the screen 23 and carried by gravity off the outlet end of the screen into a solids receiver container sub-assembly 24 or into a buried dry-well 25.

The infiltration structure 4 enables the detention and infiltration of storm water filtrate received from treatment provided by a Hydro-Master™/Coanda™ (HMC) treatment unit 20 shown in FIG. 4, or Hydro-Master™ (HM) two-stage treatment unit 20a shown in FIG. 4A, which can be accomplished in a divided single container or entirely separate sequential containers. Influent enters via inlet pipes 1, 1a and inlet port 1b. The inlet port 1b to the treatment unit TU has a predetermined cross-sectional area that controls the flow of storm water into the treatment unit. The cross-sectional area of this inlet port 1b controls the rate of flow into the TU so that any excess influent storm water flows into the bypass pipe 1c or multiple pipes. The pipe or pipes have outlets terminating offsite. Whenever the infiltration structure 4 fills to its predetermined capacity, any excess influent storm water flows into bypass pipe 2 or 2b or multiple pipes. The pipe or pipes have outlets terminating offsite.

Filtrate discharges via outlet port 2c into discharge pipe 2, which is manifolded as needed to inlet pipes 3 delivering treated storm water filtrate into infiltration structure 4. The outlet port, or ports 2c if more than one is used, have a predetermined cross-sectional area to enable storm water flowing into the treatment unit TU to exit the treatment unit at a rate at least equal to the rate at which storm water flows into the treatment unit.

Automatic drain-down of post-event standing water from treatment units 20 or 20A flows through outlet ports 2d into discharge pipe 2a which, in turn joins discharge pipe 2 downstream. At that juncture a riser pipe 2b, with removable cap 2ba rises to grade level to allow water, which may be periodically extracted from infiltration structure 4 to be returned, thus enabling recirculation of water for periodic removal of any accumulated solids. Flow from discharge pipe 2 enters infiltration structure 4 via inlet pipes 3. Water rising inside infiltration structure 4 fills perforated lateral pipes 5, allowing bypass discharge flow from infiltration structure 4 to access removably capped riser pipes 2b and discharge pipe 6, which empties into manifold 7 and offsite through curb 9 via outlet ports 8. Flow in excess of the cubic feet per second (cfs) rating of treatment units 20 or 20A rises to fill inlet pipes 1a and 1 until it empties into bypass pipe 1c and flows to manifold 7 and offsite through curb 9 via outlet ports 8. Removable/replaceable check valves 2aa may be provided in separate surface accessible vaults as needed to prevent backflow.

Periodic removal of collected solids is important to minimizing project-life cost for storm water treatment systems including all treatment units. Suspended solids captured in the treatment unit(s) cannot enter the infiltration structure. Any fine suspended solids entrained in the treatment unit filtrate will enter the infiltration structure 4. Infiltration structure 4 avoids the gradual loss of volumetric capacity to accumulated solids by periodic removal of any such fine solids, which my system enables by gravity-isolating the majority of such solids in the bottom-most sections of extended structure 4 surrounding perforated lateral pipes 5. Solids removal from the infiltration structure 4, when needed, is accomplished by removing the caps 2ba and connecting a high suction pump to riser pipes 2b to draw water and solids via perforated pipes 5 into riser pipes 2b and circulating that water with suspended solids through a separate mobile filtration system to remove suspended solids and return the water to the infiltration structure 4 via riser 2b.

Figure 2A:
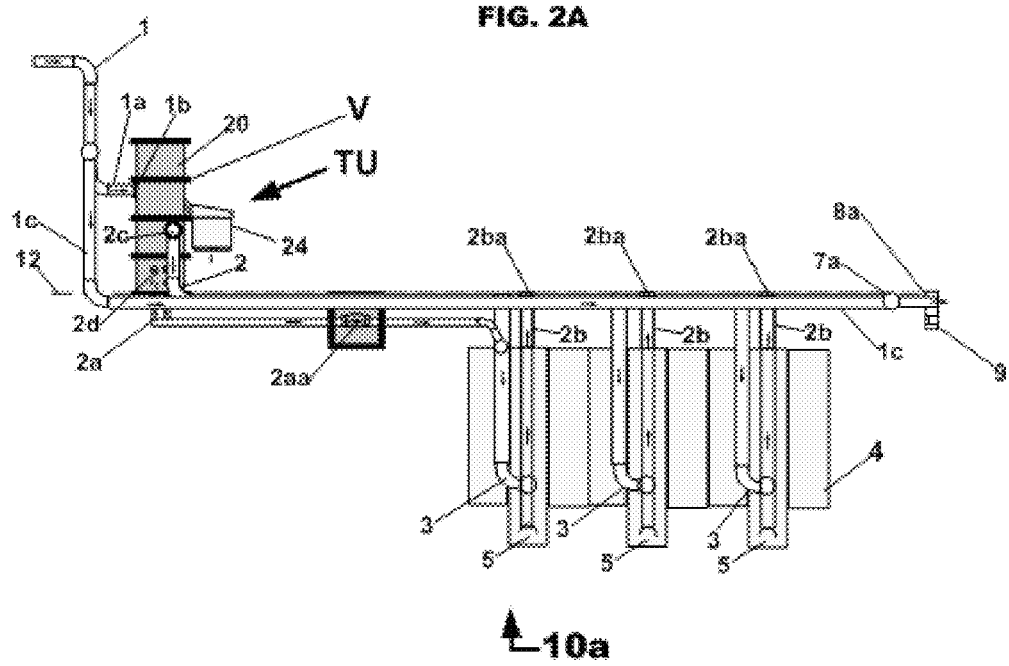
FIG. 2A is a schematic side view of the second embodiment of my storm water treatment system shown in FIG. 2.

FIGS. 1A and 2A

FIG. 1A shows a plan view of alternative LID storm water treatment system 10a comprising the infiltration structure 4, which may be constructed using EcoRain tanks, to enable the detention/infiltration of storm water filtrate received from treatment provided by a Hydro-Master/Coanda (HMC) single-stage treatment unit 20, as depicted, or Hydro-Master (HM) two-stage treatment unit 20A from FIG. 4A. Influent enters via inlet pipes 1, 1a and an inlet port 1b. Filtrate discharges via outlet port 2c into discharge pipe 2, which is manifolded as needed to inlet pipes 3 delivering treated storm water filtrate into the infiltration structure 4. Automatic drain-down of post-event standing water from treatment units 20 or 20A flows through outlet ports 2d into discharge pipe 2a which, in turn join discharge pipe 2 downstream. At that juncture a riser pipe 2b with removable cap 2ba rises to grade to allow water extracted from infiltration structure 4 to be returned, thus enabling recirculation of water for periodic removal of accumulated solids. Flow from discharge pipe 2 enters infiltration structure 4 via inlet pipes 3. Water rising inside infiltration structure 4 fills perforated lateral pipes 5 and removably capped riser pipes 2b when the infiltration structure 4 fills, and also rises in inlet pipes 3 to cause bypass flow in discharge pipe 2 to empty into manifold 7a and flow offsite through curb 9 via outlet ports 8a. Flow in excess of the cfs rating of treatment units 20 or 20A rises to fill inlet pipes 1a and 1 until it empties into bypass pipe 1c and also flows to manifold 7a and offsite through curb 9 via outlet ports 8a. Removable/replaceable check valves 2aa may be provided in separate surface accessible vaults as needed to prevent backflow.

FIG. 2B

Figure 2B:
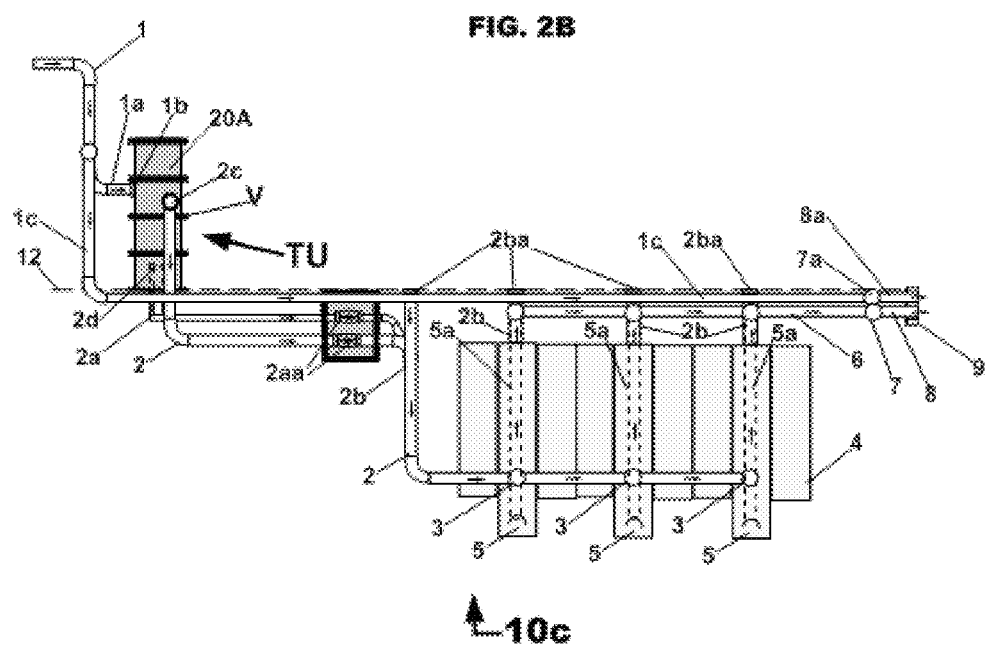
FIG. 2B is a schematic side view of a third embodiment of my storm water treatment system.

FIG. 2B shows an alternative LID storm water treatment system 10c comprising a infiltration structure 4, such as may be constructed using EcoRain tanks, to enable the detention/infiltration of storm water received from treatment provided by a Hydro-Master (HM) treatment unit 20A, which can be deployed, with respect to the top of grade 12, entirely aboveground as shown, or buried as needed. Influent enters via inlet pipes 1, 1a and inlet port 1b. Filtrate discharges via outlet port 2c into discharge pipe 2, which is manifolded as needed to inlet pipes 3 delivering pre-treated storm water filtrate to the infiltration structure 4. Automatic drain-down of post-event standing water and de-watering of collected solids within HM treatment unit 20A flows via outlet ports 2d into discharge outlet pipes 2a which then join discharge pipe 2 downstream. At that juncture a riser pipe 2b with removable cap 2ba rises to grade to allow any water extracted from infiltration structure 4 to be returned, thus enabling recirculation of water for periodic removal of accumulated solids. Water rising inside infiltration structure 4 also fills perforated lateral pipes 5 and removably capped riser pipes 2b, rising until inlet pipes 3 fill to cause bypass discharge flow from infiltration structure 4 to and discharge pipe 2 which empties into manifold 7a and offsite through curb 9 via outlet ports 8a. Flow in excess of the cfs rating of HM treatment unit 20A rises to fill inlet pipes 1a and 1 until it empties into bypass pipe 1c and flows to manifold 7a and offsite through curb 9 via outlet ports 8a.

FIG. 3

Figure 3:
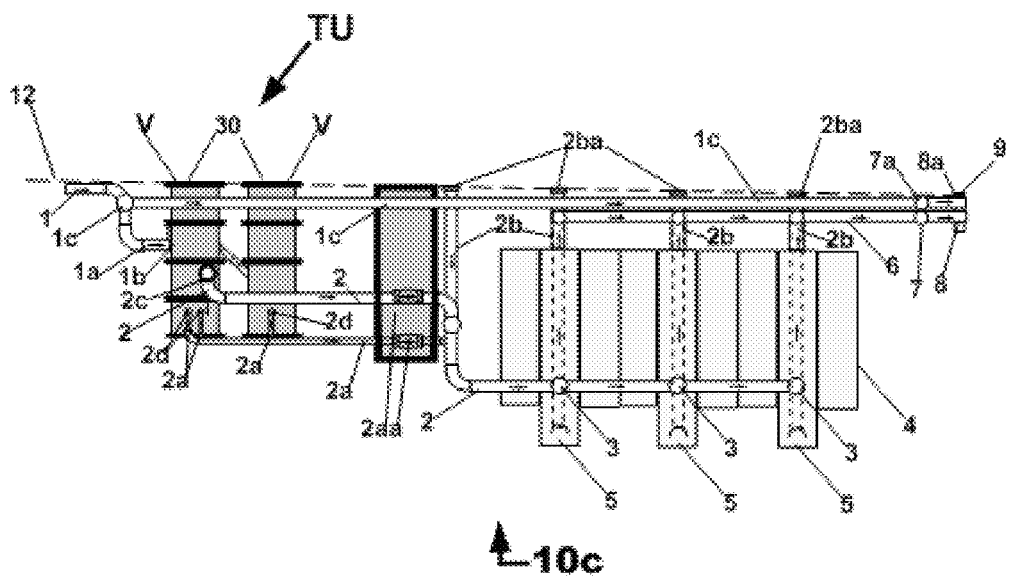
FIG. 3 is a schematic side view of a fourth embodiment of my storm water treatment system.

FIG. 3 shows the LID storm water treatment system 10c comprising a infiltration structure 4, such as may be constructed using EcoRain tanks, to enable the detention/infiltration of storm water received from pre-treatment provided by a Hydro-Master/Coanda (HMC) alternative treatment unit 30. The HMC alternative treatment units 30 can be deployed, with respect to the top of grade 12, entirely buried in-ground as shown, or partially buried as needed to accommodate site elevation gradients. Influent enters via inlet pipes 1, 1a and inlet port 1b. Filtrate discharges via outlet pipe 2, which is manifolded as needed to inlet pipes 3 delivering pre-treated storm water filtrate into infiltration structure 4. Automatic drain-down of post-event standing water from HMC alternative treatment unit 30 flows via outlet ports 2d to discharge pipes 2a which join discharge pipe 2 downstream. At that juncture a riser pipe 2b with removable cap 2ba rises to grade to allow any water extracted from infiltration structure 4 to be returned, thus enabling recirculation of water for periodic removal of accumulated solids. Water rising inside infiltration structure 4 fills perforated lateral pipes 5 allowing bypass discharge flow from infiltration structure 4 to access removably capped riser pipes 5a and discharge pipe 6 which empties into manifold 7 and offsite through curb 9 via discharge ports 8. Flow in excess of the cfs rating of HMC alternative treatment unit 30 rises to fill inlet pipes 1a and 1 until it empties into bypass pipe 1c and flows to manifold 7 and offsite through curb 9 via discharge ports 8. Removable/replaceable check valves 2aa are provided in separate surface assessable vaults as needed to prevent backflow. Periodic removal of collected solids is important to minimizing project life cost for storm water treatment systems including HMC alternative treatment unit 30. Infiltration structure 4 can avoid the gradual loss of volumetric capacity to accumulated solids by periodic removal of such solids, which my system enables by gravity-isolating the majority of such solids in the extended structure surrounding perforated lateral pipes 5. Solids removal from infiltration structure 4 is accomplished by connecting a high suction pump to riser pipes 2b to draw water and solids via perforated pipes 5 into riser pipes 5a and circulating that water with suspended solids through a separate, mobile filtration system to remove suspended solids and return the water to the infiltration structure 4 via riser 2b.

FIG. 3A

Figure 3A:
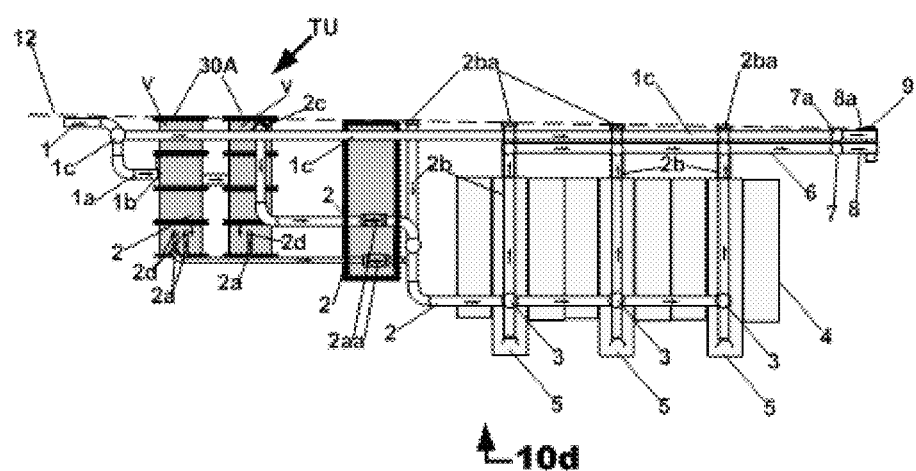
FIG. 3A is a schematic side view of a fifth embodiment of my storm water treatment system.

FIG. 3A discloses a cross-sectional view of a LID storm water treatment system 10d comprising a infiltration structure 4, such as may be constructed using EcoRain tanks, to enable the detention/infiltration of storm water received from pre-treatment provided by an in-ground Hydro-Master (HM) three-stage clarifier treatment unit 30A. The HM three-stage treatment units 30A can be deployed, with respect to the top of grade 12, entirely buried in-ground as shown, or partially buried as needed to accommodate site elevation gradients. Influent enters via inlet pipes 1, 1a and inlet port 1b. Filtrate discharges via outlet pipe 2, which is manifolded as needed to inlet pipes 3 delivering pre-treated storm water filtrate into infiltration structure 4. Automatic drain-down of post-event standing water from HM three-stage treatment unit 30A flows via outlet ports 2d to discharge pipes 2a which join discharge pipe 2 downstream. At that juncture a riser pipe 2b with removable cap 2ba rises to grade level to allow any water extracted from infiltration structure 4 to be returned, thus enabling recirculation of water for periodic removal of accumulated solids. Water rising inside infiltration structure 4 fills perforated lateral pipes 5 allowing bypass discharge flow from infiltration structure 4 to access removably capped riser pipes 2b and discharge pipe 6 which empties into manifold 7 and offsite through curb 9 via discharge ports 8. Flow in excess of the cfs rating of HM three-stage treatment units 30A rises to fill inlet pipes 1a and 1 until it empties into bypass pipe 1c and flows to manifold 7a and offsite through curb 9 via discharge ports 8a. Removable/replaceable check valves are provided in separate surface assessable vaults 2aa as needed to prevent backflow.

Periodic removal of collected solids is important to minimizing project life cost for storm water treatment systems including HM three-stage treatment unit 30A. Infiltration structure 4 can avoid the gradual loss of volumetric capacity to accumulated solids by periodic removal of such solids, which my system enables by gravity-isolating the majority of such solids in the extended structure surrounding perforated lateral pipes 5. Solids removal is accomplished by connecting a high suction pump to riser pipes 2b to draw water and solids via perforated pipes 5 into riser pipes 5a and circulating that water with suspended solids through a separate, mobile filtration system to remove suspended solids and return the water to the infiltration structure 4 via riser 2b.

FIG. 3B

FIG. 3B shows an alternative LID storm water treatment system 10e comprising a infiltration structure 4, such as may be constructed using EcoRain tanks, to enable the detention/infiltration of storm water received from pre-treatment provided by a Hydro-Master (HM) three-stage treatment unit 30A. The HM three-stage treatment units 30A can be deployed, with respect to the top of grade 12, entirely buried in-ground as shown, or partially buried as needed to accommodate site elevation gradients. Influent enters via inlet pipes 1, 1a and inlet port 1b. Filtrate discharges via outlet pipe 2 which is manifolded as needed to inlet pipes 3 delivering treated storm water filtrate into infiltration structure 4. Automatic drain-down of post-event standing water from HM three-stage treatment unit 30A flows via outlet ports 2d to discharge pipes 2a which join riser pipe 2b with removable cap 2ba downstream which also allows any water extracted from infiltration structure 4 to be returned, thus enabling recirculation of water for periodic removal of accumulated solids. Water rising inside infiltration structure 4 fills perforated lateral pipes 5 and removably capped riser pipes 2b and, finally, rises to fill inlet pipes 3 and enable bypass discharge flow from infiltration structure 4 to access and discharge pipe 2 which empties into manifold 7a and offsite through curb 9 via discharge ports 8a. Removable/replaceable check valves may be provided in separate surface accessible vaults 2aa as needed to prevent backflow.

Flow in excess of the cfs rating of HM three-stage treatment units 30A rises to fill inlet pipes 1a and 1 until it empties into bypass pipe 1c and discharge pipe 2 and flows to manifold 7a and offsite through curb 9 via discharge ports 8a. Periodic removal of collected solids is important to minimizing project life cost for storm water treatment systems including HM three-stage treatment unit 30A. Infiltration structure 4 can avoid the gradual loss of volumetric capacity to accumulated solids by periodic removal of such solids, which this my system enables by gravity-isolating the majority of such solids in the extended structure surrounding perforated lateral pipes 5. Solids removal is accomplished by connecting a high suction pump to riser pipes 2b to draw water and solids via perforated pipes 5 into riser pipes 2b and circulating that water with suspended solids through a separate, mobile filtration system to remove suspended solids and return the water to the infiltration structure 4 via riser 2b.

FIGS. 4 and 4'

FIGS. 4 and 4' show a Hydro-Master™/Coanda™ (HMC) treatment system 20 comprising pre-fabricated stacked, round modular elements made of polypropylene. In this particular embodiment, a container 21 comprising multiple sections of commercially available round EZ-set risers 21a which have good load-bearing characteristics and are manufactured to be buried for connection to underground septic tanks. The risers 21a are hydraulically sealed at all horizontal and vertical points of contact with any structures, with one or more layers of 3M Weatherban Ribbon Sealant (or equiv), and are then assembled/connected to adjacent risers 21a, or to horizontal/vertical stainless steel sub-assemblies with stainless steel fasteners and use a removable EZ-set riser solid cover with solid covers and locking bands 21b. This HMC treatment system 20 is designed to function as the TSS/TOG removal element of a LID treatment system 10 and sit on a flat site gradient 12, or be partially buried, and accept storm water run-off from above-grade watershed surfaces with sufficient elevation gradient to enable gravity flow of influent via feed inlet pipes 1 and 1a through inlet port 1b arriving at the proper elevation to enable HMC treatment unit 20 to operate at rated full system flow before the hydraulic gradient level (HGL) 22 rises to fill inlet pipe 1 causing bypass downstream flow via bypass pipe 1c as shown on FIGS. 1 and 2.

Influent entering the upstream vertical treatment compartment 21c flows down onto upstream bottom filter 21dd, located in the upstream portion of horizontal divider plate 21d, then rises, with sufficient volume, to fill the removable flow control box 21e and flow up, around and over the run-on plate 21f to discharge through outlet port 21gg in the vertical hydraulic divider 21g into the downstream vertical treatment compartment 21h then onto and through the removable Coanda™ screen sub-assembly 23 leaving behind solids to be automatically discharged off the downstream end of the removable Coanda™ screen sub-assembly 23, through a stainless steel funnel 21i and into the removably-mounted solids receiver container sub-assembly 24, which consists of a container 24a, with removable cover 24b, in which solids are automatically collected and residual water is automatically drained down through its hinged bottom filter screens 24c and filter media 24d into a gravel filled dry-well 24e. Water and fine solids passing through the removable Coanda™ screen sub-assembly 23 flow down onto downstream bottom filter 21de, located in the downstream portion of horizontal divider plate 21d, where the water rises, leaving behind suspended solids, to discharge via outlet 2c into discharge pipe 2, as shown in FIGS. 1 and 2. Automatic drain-down of water in container 21, for mosquito control and de-watering of collected solids, occurs by gravity flow through upstream and downstream bottom filters 21dd and 21de, into each bottom cavity 21k, which is closed and sealed by horizontal divider plate 21d', until the water can discharge via the automatic drain-down lines 2d into discharge pipe 2a then connect with discharge pipe 2 at riser pipe 2b and flow downstream as shown on FIGS. 1 and 2.

FIGS. 4A and 4A'

FIGS. 4A and 4A' show a Hydro-Master™ (HM) two-stage treatment unit 20a comprising pre-fabricated stacked, round modular elements made of polypropylene. In this particular embodiment, container 21 consists of multiple sections of commercially available round EZ-set risers 21a which have good load-bearing characteristics and are manufactured to be buried for connection to underground septic tanks. The risers 21a are hydraulically sealed at all horizontal and vertical points of contact with any structures, with one or more layers of 3M Weatherban Ribbon Sealant (or equiv), and are then attached/connected to adjacent risers 21a, or to horizontal/vertical stainless steel sub-assemblies with stainless steel fasteners and use a removable EZ-set riser solid cover with aluminum locking ring 21b This HM two-stage treatment unit 20a is designed to sit on a flat site gradient 12, or be buried as needed, and accept storm water run-off from above-grade watershed surfaces with sufficient elevation gradient to enable gravity flow of influent via feed inlet pipes 1 and 1a through inlet port 1b, arriving at the proper elevation to enable above-ground treatment unit 20a to operate at rated full system flow before the hydraulic gradient level (HGL) 22 rises to fill inlet pipe 1. This causes bypass downstream flow via bypass pipe 1c. Influent entering the upstream vertical treatment vault V, compartment 21c, flows down onto upstream bottom filter 21dd, located in the upstream portion of horizontal divider plate 21d, then rises, with sufficient volume, to fill the removable flow control box 21e and flow up, around and over the run-on plate 21f to discharge through outlet port 21gg in the vertical hydraulic divider 21g, into the downstream vertical treatment vault V, compartment 21h and flow down onto downstream bottom filter 21de, located in the downstream portion of horizontal divider plate 21d, where the water rises, leaving behind suspended solids, to discharge via outlet 2c into discharge pipe 2. Automatic drain-down of water in container 21, for mosquito control and de-watering of collected solids, occurs by gravity flow through upstream and downstream bottom filters 21dd and 21de, into each bottom cavity 21k, which is closed and sealed by horizontal divider plate 21d' until the water can discharge via the automatic drain-down lines 2d into discharge pipe 2a then connect with discharge pipe 2 at riser pipe 2b and flow downstream as shown on FIGS. 1 and 2A.

FIGS. 4B and 4B'

FIGS. 4B and 4B' show a Hydro-Master (HM) single-stage treatment unit 20b which can be substituted for HMC treatment unit 20 in FIG. 2 or HM two-stage treatment unit 20a in FIG. 2A. HM two-stage treatment unit 20A is comprised of pre-fabricated stacked, rectangular or round modular elements made of materials such as fiberglass, polyethylene or polypropylene. In this particular embodiment, container 21 comprises multiple sections of commercially available round EZ-set risers 21a which have good load-bearing characteristics and are manufactured to be buried for connection to underground septic tanks. The risers 21a are hydraulically sealed at all horizontal and vertical points of contact, with one or more layers of 3M Weatherban Ribbon Sealant (or equiv), and are then attached/connected to adjacent risers 21a, or to horizontal stainless steel sub-assemblies with stainless steel fasteners and use a removable EZ-set riser solid cover 21b with aluminum locking ring.

This treatment system 20b is designed to sit on a flat site gradient 12, or be buried as needed, and accept storm water run-off from watershed surfaces via above or below grade piping with sufficient elevation gradient to enable gravity flow of influent via feed inlet pipes 1 and 1a through inlet port 1b arriving at the proper elevation to enable above-ground treatment unit 20b to operate at rated full system flow before the hydraulic gradient level (HGL) 22 rises to fill inlet pipe 1 causing bypass downstream flow via bypass pipe 1c. Influent flows down onto bottom filter 21l, located in horizontal divider plate 21d, then rises, with sufficient volume, to flow control pipe 2cc through outlet 2c into discharge pipe 2. Automatic drain-down of water in treatment vault V, container 21, for mosquito control and de-watering of collected solids, occurs by gravity flow through upstream and downstream bottom filters 21l into bottom cavity 21k, which is closed and sealed by horizontal divider plate 21d' until the water can discharge via the automatic drain-down lines 2*d* into discharge pipe 2*a* then connect with discharge pipe 2 at riser pipe 2*b* and flow downstream as shown on FIGS. 1 and 2A.

FIGS. 4C and 4C'

FIGS. 4C and 4C' show the Hydro-Master™/Coanda™ (HMC) treatment unit 20*c* which can be substituted for HMC treatment unit 20 in FIG. 2. HMC treatment unit 20*c* round modular elements made of polypropylene. The risers 21*a* are hydraulically sealed at all horizontal and vertical points of contact, with one or more layers of 3M Weatherban Ribbon Sealant (or equiv), and are then attached/connected to adjacent risers 21*a*, or to horizontal/vertical stainless steel subassemblies with stainless steel fasteners and use a removable EZ-set riser solid cover with aluminum locking ring 21*b* This treatment unit 20*c* is designed to function as the TSS/TOG removal element of a LID treatment system 10 and sit on a flat site gradient 12, or be buried as needed, and accept storm water run-off from watershed surfaces via above or below grade piping with sufficient elevation gradient to enable gravity flow of influent via feed inlet pipes 1 and 1*aa* through inlet port 1*bb* which is sized to limit inflow to the removable Coanda™ screen sub-assembly 23. In other words, the cross-sectional area of this inlet port 1*bb* is properly sized for each watershed site so that the flow rate into the treatment unit TU is not greater than the maximum flow rate allowed in order to comply with the low impact development regulations governing the site. A greater inflow than the port 1*bb* orifice will allow causes the hydraulic gradient level (HGL) 22 to rise to fill inlet pipe 1*aa*, causing a back up flow into outlet pipe 1*ab* and bypass downstream flow via bypass pipe 1*c* as shown on FIGS. 1 and 2A. Positioning vertically the inlet to my system above the inlet to the treatment unit TU, and positioning the inlet to the bypass pipe between the system inlet and the treatment unit inlet, and with the outlet of the bypass line below the treatment unit outlet, storm water flows through my system by gravity under all rainfall conditions, heavy or light.

Flow entering via inlet port 1*bb*, which includes a run-on plate element 21*f*, discharges onto and through the removable Coanda™ screen sub-assembly 23 leaving behind solids to be automatically discharged off the downstream end of the removable Coanda™ screen sub-assembly 23, through a stainless steel funnel 21*i* and into the removably-mounted solids receiver container sub-assembly 24, which consists of a container 24*a*, with removable cover 24*b*, in which solids are automatically collected and residual water is automatically drained down through its hinged bottom filter screens 24*c* and filter media 24*d* into a gravel filled dry-well 24*e*. Water and fine solids passing through the removable Coanda screen sub-assembly 23 flow down onto bottom filter 21*l* where the water rises, leaving behind suspended solids, to discharge via outlet 2*c* into discharge pipe 2, as shown in FIGS. 1 and 2. Automatic drain-down of water in container 21 occurs by gravity flow through bottom filter 21*l* into bottom cavity 21*k*, which is closed and sealed by horizontal divider plate 21*d'*, until the water can discharge via the automatic drain-down line 2*d* into discharge pipe 2*a* then connect with discharge pipe 2 at riser pipe 2*b* and flow downstream as shown on FIGS. 1 and 2.

Figure 5:
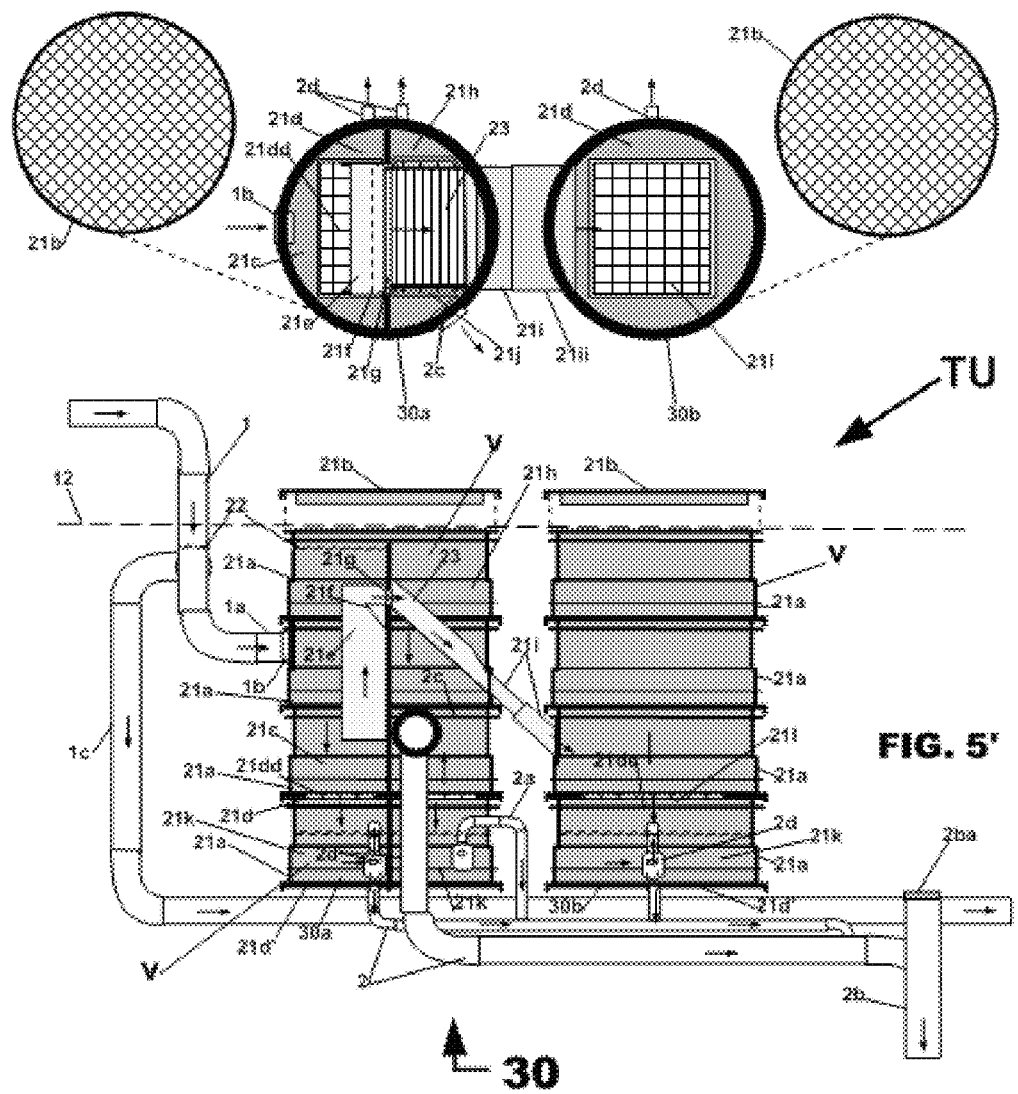
FIG. 5 is a schematic plan view of an alternative Hydro-Master™/Coanda™ (HMC) treatment unit used in the storm water treatment system shown in FIG. 3, with an exploded solid covers.
Figure 6:
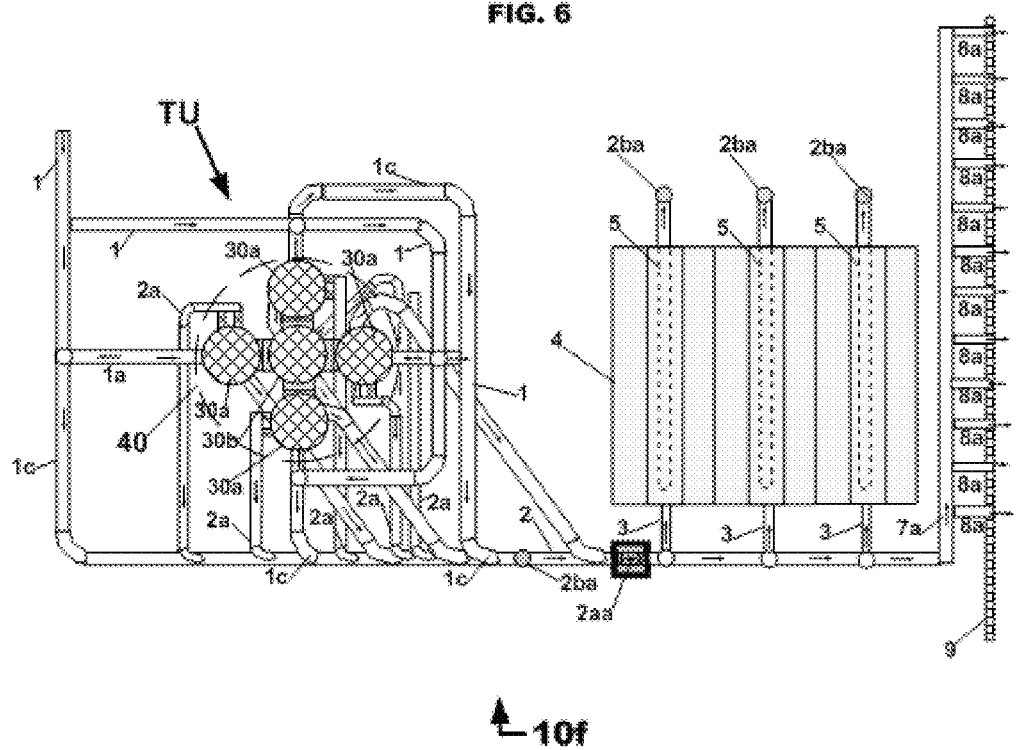
FIG. 6 is a schematic plan view of a seventh embodiment of my storm water treatment system.

FIGS. 5 and 5'

FIGS. 5 and 5' show the Hydro-Master™/Coanda™ (HMC) treatment system 30 of FIG. 3. HMC treatment system 30 includes two HMC treatment vaults V and one solids receiver vault V, container unit 30*b*, both comprised of the EZ-set riser sections 21*a* and removable solid covers 21*b* as in treatment unit 21 of FIG. 4. Treatment unit 30*a* functions as the TSS/TOG removal element of a LID treatment system 10 and is also designed to accept storm water run-off from building roofs or from watershed surfaces with sufficient elevation gradient to enable gravity flow of influent via feed inlet pipes 1 and 1*a* to arrive at the proper elevation to enable treatment unit 30*a* to operate at rated full system flow before the hydraulic gradient level (HGL) 22 rises to fill inlet pipe 1 causing bypass downstream via bypass pipe 1*c* as shown on FIG. 3. Influent entering the upstream vertical treatment compartment 21*c* flows down onto upstream bottom filter 21*dd*, then rises, with sufficient volume, to fill the removable flow control box 21*e* and flow up, around and over the run-on plate 21*f* to discharge through outlet port 21*gg* in the vertical hydraulic divider 21*g*, into the downstream vertical treatment compartment 21*h* then onto and through the removable Coanda™ screen sub-assembly 23, leaving behind solids to be automatically discharged off the downstream end of the removable Coanda screen sub-assembly 23. Water passing through the Coanda™ screen 23 of treatment unit 30*a* flows down onto downstream bottom filter 21*de*, then rises to discharge via outlet 2*c* into filtrate drain line 2 as shown on FIG. 3. Solids sliding down the slope of Coanda™ screen 23 discharge through stainless steel funnels 21*i* onto the bottom filter 21*l* of solids receiver unit 30*b* where the small amount of residual water is automatically drained down through bottom filter 21*l* into bottom cavity 21*k*, which is closed and sealed by horizontal divider plate 21*d'*, until the water rises to discharge via the automatic drain-down lines 2*d* into discharge pipe 2*a* then connect with discharge pipe 2 and flow downstream as shown on FIG. 3.

FIGS. 5A and 5A'

FIGS. 5A and 5A' show the Hydro-Master (HM) three-stage treatment system 30*a* of FIG. 3A. HM three-stage treatment system 30*a* functions as the TSS/TOG removal element of a LID treatment system 10 and consists of two HM treatment vaults V, container 30Aa with sections 21*c* and 21*d* and one solids receiver vault V, container 30Ab, both comprised of the EZ-set riser sections 21*a* and removable solid covers 21*b* as in treatment unit 21 of FIG. 4. HM three-stage treatment unit 30*a* is also designed to accept storm water run-off from building roofs or from watershed surfaces with sufficient elevation gradient to enable gravity flow of influent via feed inlet pipes 1 and 1*a* to arrive at the proper elevation to enable HM three-stage treatment unit 30Aa to operate at rated full system flow before the hydraulic gradient level (HGL) 22 rises to fill inlet pipe 1, causing bypass downstream via bypass pipe 1*c* as shown on FIG. 3A. Influent entering the upstream vertical treatment compartment 21*c* flows down onto upstream bottom filter 21*d*, then rises, with sufficient volume, to fill the removable flow control box 21*e* and flow up, around and over the run-on plate 21*f* to discharge through outlet port 21*gg* in the vertical hydraulic divider 21*g*, into the downstream vertical treatment compartment 21*h* and flows down onto downstream bottom filter 21*j*, then rises to discharge via outlet 2*c* into solids receiver unit 30Ab and onto bottom filter 21*l* where the water rises to outlet 2*c* of solids receiver unit 30Ab and enters discharge pipe 2. Standing water is automatically drained-down, for mosquito control and solids de-watering, through bottom filter 21*l* into bottom cavity 21*k* until the water rises to discharge via the automatic drain-down lines 2*d* into discharge pipe 2*a* then connect with discharge pipe 2 and flow downstream as shown on FIG. 3A.

FIGS. 5B and 5B'

FIGS. 5B and 5B' show an alternative Hydro-Master™/Coanda™ (HMC) single-stage treatment vault V, unit 20*d* formed of stacked precast concrete modules 31, 32, and 33 with hinged solid cover 34, rectangular inlet connection 32 and outlet connections 31*a* and 32*b*, not showing any external piping connections, where water passes through the Coanda screen. There are rectangular inlet/outlet connections where the solids gravity discharge from the Coanda screen and fall directly into an externally located, recessed dry well 25 such as shown in FIG. 5B'.

FIG. 6

FIG. 6 a LID storm water treatment system 10f having a "maximum deployment array" configuration 40. Its inlet and discharge connections for this configuration will utilize the ports and piping of FIG. 5 modified only as needed to enable port access and expand the basic piping of FIG. 3. It includes a Hydro-Master™/Coanda™ (HMC) treatment unit TU consisting of four (4) treatment units 30a combined to discharge primary solids collection into one (1) receiver unit 30b. It also includes an infiltration structure 4, such as may be constructed using EcoRain tanks, to enable the detention/infiltration of storm water received from the treatment unit TU. Removable/replaceable check valves 2aa may be provided in separate surface assessable vaults as needed to prevent backflow.

SUMMARY

In my system during normal rainfall, storm water flows by gravity into the treatment unit TU at a rate that does not exceed the maximum allowed flow rate to comply with the regulations governing the site. The treatment unit TU removes solids and hydrocarbons from the storm water flowing through it, and the treated storm water from the treatment unit flows by gravity into the downstream detention and infiltration structure 4, where the treated water seeps over time into the ground at the site. During very heavy rainfall, excess amounts of storm water flow into the system at rates exceeding the maximum rate determined by the size of the inlet port 1bb of the treatment unit. The cross-sectional area dimensions of the inlet port 1bb limit the rate of inflow into the treatment unit to the maximum flow rate. Any excess water flowing into my system is directed by gravity to bypass the treatment unit TU. Normally this excess water flows offsite, but may under some circumstances be stored on site. For most selected watershed surfaces an individual cross-sectional area of the inlet port 1bb ranges substantially from 12 to 400 square inches. Typically, for most watershed sites, the rate at which water normally flows into the treatment unit ranges substantially from 0.2 to 18 cubic feet per second.

Design Considerations:

1. Treatment units and detention/infiltration structures used may be designed and constructed to be fully capable of supporting the design storm water storage volume and surrounding soil and activity loading for which the site is being constructed, during the full project life without replacement.
2. Detention/infiltration structures are sized to receive at least the design storm treatment "Qpm" volume plus reasonable freeboard.
3. Treatment units and detention/infiltration structures shall include as needed a high flow bypass pathway for the delivery of excess water to offsite discharge or other structures.
4. Detention/infiltration structures may be designed to maximize water volume storage and minimize the structure footprint.
5. Detention/infiltration structures may include vertical/horizontal tube penetration(s) to enable fluid entry, venting, inspection, extraction and/or control circuitry access pathways.
6. Detention/infiltration structures may be capable of being comprised of clusters of smaller structures positioned to enable parallel and/or series inter-connection of such multiple structures.
7. Detention/infiltration structures lacking manhole direct access for periodic removal of settled solids may be designed to be capable of being fully penetrated horizontally across at least one major axis dimension by perforated or slotted pipe for extraction of water and suspended solids to be transferred to secondary treatment. Such water transfer includes the maximum possible entrained solids acquired by gravity flow from the structure, where site elevation gradients so permit, but using a high suction transfer pump may be desirable in some circumstances.
8. Filtrate, bypass and automatic drain-down water flow from treatment equipment may include accessible, replaceable back-flow prevention/check valves in separate surface assessable vaults as needed.
9. Automatic control of any pump power needed shall be accomplished by providing a panel at a safe, accessible, above-ground location to enable sensor/control signals from inside the detention/infiltration structure to be used for controlling the pump power source(s).
10. Primary and secondary TSS and TOG treatment may be accomplished using Hydro-Master (HM) and/or Hydro-Master/Coanda (HMC) series treatment system(s).

My system and method of primary and secondary treatment of storm water runoff associated with the use of detention/infiltration structures is a BMP treatment train which maximizes contaminant removal while, at the same time, simplifying and reducing the project life cost of providing, installing, periodically inspecting and servicing the equipment used for such storm water treatment purposes.

SCOPE OF THE INVENTION

The above presents a description of the best mode contemplated of carrying out my invention, and of the manner and process of making and using it, in such full, clear, concise, and exact terms as to enable any person skilled in the art to which it pertains to make and use this invention. My invention is, however, susceptible to modifications and alternate constructions from that discussed above which are fully equivalent. Consequently, it is not my intention to limit my invention to the particular embodiments disclosed. On the contrary, my intention is to cover all modifications and alternate constructions coming within the spirit and scope of my invention as generally expressed by the following claims, which particularly point out and distinctly claim the subject matter of my invention:

The invention claimed is:

1. A system for treating storm water flowing from a selected watershed surface in compliance with low impact development regulations, including
   an underground infiltration structure,
   a treatment unit that removes suspended solids and hydrocarbons from the storm water flowing through said treatment unit,
   said treatment unit having a sufficient volumetric capacity to treat a predetermined initial fraction of the storm water flowing from the watershed surface into the treatment unit through an inlet to the treatment unit at a controlled predetermined rate to be in compliance with the low impact development regulations governing said selected watershed surface,
   piping structure interconnecting the system inlet upstream with the treatment unit inlet and interconnecting the treatment unit upstream of the infiltration structure so that storm water from the watershed flows into the ground through the infiltration structure, and a bypass line including an inlet in communication the system inlet and the treatment unit inlet so that, when the rate of storm water flowing to the treatment unit inlet is at a rate greater than said controlled predetermined rate, any excess water entering the system is diverted to the bypass line inlet, said treatment unit has one or more outlets in communication with the infiltration structure, said outlet, or outlets in combination, having a predetermined cross-sectional area to enable storm water flowing into the treatment unit to exit the treatment unit at a rate at least equal to the rate at which storm water flows into the treatment unit.

2. The system of claim 1 where the inlets, treatment unit, and underground infiltration structure are positioned relative to each other so that storm water flows through the system essentially solely by gravity.

3. A system for treating storm water flowing from a selected watershed surface in compliance with low impact development regulations, including an underground infiltration structure, a treatment unit that removes suspended solids and hydrocarbons from the storm water flowing through said treatment unit, and a bypass line having an inlet in communication the system inlet and the treatment unit, said treatment unit having a flow rate capacity at least equaling a predetermined fraction (Qpm) specified for a predetermined maximum volumetric discharge (Qmax) of the storm water flowing from the selected watershed surface, and said bypass line having a flow rate capacity at least equal to the difference between the Qmax and the Qpm, and said treatment unit being upstream of the underground infiltration structure and said treatment unit, underground infiltration structure and bypass line positioned relative to each other so that storm water flows through the system essentially solely by gravity, said treatment unit has one or more outlets in communication with the infiltration structure, said outlet, or outlets in combination, having a predetermined cross-sectional area to enable storm water flowing into the treatment unit to exit the treatment unit at a rate at least equal to the rate at which storm water flows into the treatment unit.

4. A system for treating storm water flowing from a selected watershed surface in compliance with low impact development regulations, including an underground infiltration structure in which water is retained for a predetermined dwell time and slowly seeps into the ground, upstream of the infiltration structure a treatment unit that removes from the storm water flowing through the treatment unit suspended solids and hydrocarbons, said treatment unit having a sufficient volumetric capacity to treat a predetermined initial fraction of the storm water flowing from the watershed surface to be in compliance with the low impact development regulations governing said selected watershed surface, an outlet from the treatment unit in communication with an inlet to the infiltration structure, said outlet having a predetermined cross-sectional area to enable storm water flowing into the treatment unit to exit the treatment unit at a rate at least equal to the rate at which storm water flows into the treatment unit, and an inlet to the treatment unit which has a predetermined cross-sectional area that limits the flow of influent storm water entering the treatment unit to a predetermined maximum rate in order to be in compliance with low impact development regulations governing said selected watershed surface, and any excess influent storm water entering the system flows into a bypass line having an outlet terminating offsite of the watershed surface, said bypass line, treatment unit, and underground infiltration structure being positioned relative to each other so that storm water flows through the system essentially solely by gravity.

5. The system and method of claim 4 where the flow of treated storm water from the treatment unit is prevented from backing up and filling the treatment unit by a back-flow prevention device.

6. The system of claim 4 where the gradient of the watershed surface is essentially zero and the treatment unit is entirely above the selected watershed surface or partially or fully-buried as needed to maintain gravity flow.

7. The system of claim 4 where the treatment unit has a flow rate capacity at least equaling the predetermined fraction (Qpm) specified for a predetermined maximum volumetric discharge (Qmax) of the storm water flowing from the watershed surface and the bypass line has a flow rate capacity at least equal to the difference between the Qmax and the Qpm.

8. The system of claim 4 where the relative positions of the treatment unit inlet and outlet, bypass line outlet, and underground infiltration structure provide automatic drain down of substantially all post-rainfall standing water for mosquito control and de-watering of collected solids in the treatment unit.

9. The system of claim 4 where the infiltration structure includes a bottom-most chamber for holding storm water, a perforated pipe member horizontally extending substantially along a lower portion of said chamber, and a vertical riser connected to the perforated pipe member, and a removable cap connected to a riser end that terminates at or near the watershed surface.

10. The system of claim 4 where the treatment unit comprises a plurality of stacked vault modules with a substantially horizontal stainless steel collection structure deployed to capture suspended solids that settle by gravity, said treatment unit includes a stainless steel, self-cleaning, non-clogging screen that separates water from entrained solids and diverts the water through the screen leaving solids having an average particle size greater than 300 microns, to discharge by gravity at an outlet end of the screen, and said screen is oriented at an angle and slopes downward between the treatment unit inlet and the treatment unit outlet and is positioned so that substantially all the storm water flowing into the treatment unit flows through the screen, said screen having a perimeter that is held between adjacent vaults on a slant.

11. The system of claim 4 where the treatment unit comprises a plurality of stacked plastic vault modules of suitable strength to be buried at a predetermined underground depth with a removable top cover at or near the watershed surface, and each said individual vault module having a weight that is less than 300 pounds.

12. The system of claim 4 where the predetermined initial fraction flows through a plurality of treatment units prior to flowing into the infiltration structure.

13. The system of claim 4 where the treatment unit inlet is configured to limit the flow rate of storm water into said treatment unit to cause storm water in excess of that flow rate to back up into an inlet pipe member connected to the bypass line so the excess storm water flows into the bypass line, and the cross-sectional area of the treatment unit outlet or outlets are sufficiently greater than the cross-sectional area of the treatment unit inlet to reduce the velocity of storm water flowing from said treatment unit outlet or outlets and improve gravity-settling of fine particulate solids having a particle diameter substantially from <300 to <25 microns.

14. A system for treating storm water flowing from a selected watershed surface in compliance with low impact development regulations, including an underground infiltration structure, upstream of the infiltration structure a treatment unit that removes suspended solids and hydrocarbons from influent storm water flowing through the treatment unit, said treatment unit having an inlet into which the influent water from the watershed surface flows and an outlet through which treated storm water exits the treatment unit and flows into the underground infiltration structure, a bypass line for the system having an inlet in communication with the inlet of the treatment unit and an outlet, and said treatment unit inlet having a predetermined cross-sectional area that controls the volumetric flow of influent storm water into the treatment unit so that any excess influent storm water backs up and flows into the bypass line inlet and through the bypass line and out the bypass line outlet, said treatment unit inlet and outlet, bypass line inlet and outlet, and underground infiltration structure positioned relative to each other so that storm water flows through the system essentially solely by gravity, said treatment unit has one or more outlets in communication with the infiltration structure, said outlet, or outlets in combination, having a predetermined cross-sectional area to enable storm water flowing into the treatment unit to exit the treatment unit at a rate at least equal to the rate at which storm water flows into the treatment unit.

15. The system of claim 14 including a bypass line for the underground infiltration structure having an outlet terminating offsite and an inlet in communication with an outlet of the infiltration structure.

16. A system for treating storm water flowing from a selected watershed surface in compliance with low impact development regulations governing the selected watershed surface, including an underground infiltration structure upstream of a treatment unit that removes suspended solids and hydrocarbons from influent storm water flowing through the treatment unit, said treatment unit having an inlet into which the influent water from the watershed surface flows and an outlet through which treated storm water exits the treatment unit and flows into the underground infiltration structure, and said treatment unit having a sufficient volumetric capacity to treat a predetermined initial fraction of the storm water flowing from the watershed surface to be in compliance with said low impact development regulations governing said selected watershed surface and said treatment unit inlet having a predetermined cross-sectional area that limits the rate at which influent storm water enters the inlet to a predetermined maximum as established by the volumetric capacity of the treatment unit, said treatment unit inlet and outlet and the underground infiltration structure positioned relative to each other so that storm water flows through the system essentially solely by gravity, and, said treatment unit has one or more outlets in communication with the infiltration structure, said outlet, or outlets in combination, having a predetermined cross-sectional area to enable storm water flowing into the treatment unit to exit the treatment unit at a rate at least equal to the rate at which storm water flows into the treatment unit, said means for diverting away from the treatment unit inlet any excess influent storm water entering the system whenever the rate at which influent storm water at the treatment unit inlet exceeds said predetermined maximum rate.

17. A method of treating storm water falling on a selected watershed site in compliance with low impact development regulations governing the selected watershed site, comprising the steps of (a) directing storm water falling on the surface of the watershed site into a treatment unit that removes suspended solids and hydrocarbons from influent storm water flowing through the treatment unit and then into a downstream underground infiltration structure, said treatment unit and infiltration structure being on site, and said treatment unit having a sufficient volumetric capacity to treat a predetermined initial fraction of the storm water flowing from the watershed surface to be in compliance with said low impact development regulations governing said selected watershed site, (b) positioning the treatment unit inlet and outlet and underground infiltration structure relative to each other so that storm water flows through the system essentially solely by gravity, and (c) whenever the rate at which influent storm water at the treatment unit inlet exceeds a predetermined maximum rate in order to be in compliance with low impact development regulations governing said selected watershed site, diverting any excess influent storm water entering the system into a bypass line, said treatment unit inlet has a cross-sectional area that is selected to control the flow excess influent storm water as set forth in step (c), said treatment unit has one or more outlets in communication with the infiltration structure, said outlet, or outlets in combination, having a predetermined cross-sectional area to enable storm water flowing into the treatment unit to exit the treatment unit at a rate at least equal to the rate at which storm water flows into the treatment unit.

18. A method of treating storm water flowing from a selected watershed surface in compliance with low impact development regulations, including the steps of (a) directing by gravity storm water into a treatment unit that removes suspended solids and hydrocarbons from the storm water, said water flowing from the selected watershed surface into a treatment unit at an uncontrolled rate, said treatment unit having an inlet sized to control the flow of storm water into the treatment unit at a predetermined rate to be in compliance with the low impact development regulations governing said selected watershed surface, said treatment unit has one or more outlets in communication with the infiltration structure, said outlet, or outlets in combination, having a predetermined cross-sectional area to enable storm water flowing into the treatment unit to exit the treatment unit at a rate at least equal to the rate at which storm water flows into the treatment unit, (b) directing by gravity treated storm water from the treatment unit into a downstream underground infiltration structure, and (c) diverting by gravity any excess water entering the system to flow offsite when the rate of storm water flowing to the treatment unit is at a rate greater than said controlled predetermined rate.

* * * * *